United States Patent
Zhao et al.

(10) Patent No.: US 11,800,543 B2
(45) Date of Patent: Oct. 24, 2023

(54) COMMUNICATION METHOD IN V2X SYSTEM, TERMINAL DEVICE AND NETWORK DEVICE

(71) Applicant: GUANGDONG OPPO MOBILE TELECOMMUNICATIONS CORP., LTD., Dongguan (CN)

(72) Inventors: Zhenshan Zhao, Dongguan (CN); Qianxi Lu, Dongguan (CN); Huei-Ming Lin, Victoria (AU)

(73) Assignee: GUANGDONG OPPO MOBILE TELECOMMUNICATIONS CORP., LTD.

(*) Notice: Subject to any disclaimer, the term of this patent is extended or adjusted under 35 U.S.C. 154(b) by 73 days.

(21) Appl. No.: 17/480,465

(22) Filed: Sep. 21, 2021

(65) Prior Publication Data
US 2022/0007369 A1   Jan. 6, 2022

Related U.S. Application Data

(63) Continuation of application No. PCT/CN2019/080272, filed on Mar. 28, 2019.

(51) Int. Cl.
| | | |
|---|---|---|
| *H04W 4/00* | (2018.01) | |
| *H04W 72/52* | (2023.01) | |
| *H04W 28/02* | (2009.01) | |
| *H04W 72/02* | (2009.01) | |
| *H04W 72/56* | (2023.01) | |

(52) U.S. Cl.
CPC ....... *H04W 72/52* (2023.01); *H04W 28/0268* (2013.01); *H04W 28/0289* (2013.01); *H04W 72/02* (2013.01); *H04W 72/56* (2023.01)

(58) Field of Classification Search
CPC ............ H04W 72/52; H04W 28/0268; H04W 28/0289; H04W 72/02; H04W 72/56; H04W 72/21
USPC .................................................. 370/329, 330
See application file for complete search history.

(56) References Cited

U.S. PATENT DOCUMENTS

| | | | |
|---|---|---|---|
| 10,660,046 B2* | 5/2020 | Liu | H04W 52/242 |
| 2018/0234973 A1 | 8/2018 | Lee et al. | |
| 2020/0235887 A1* | 7/2020 | Hou | H04W 72/1263 |
| 2021/0211906 A1* | 7/2021 | Chae | H04W 24/10 |
| 2021/0289507 A1* | 9/2021 | Wang | H04W 28/0289 |

(Continued)

FOREIGN PATENT DOCUMENTS

| | | |
|---|---|---|
| CN | 108024286 A | 5/2018 |
| CN | 108541017 A | 9/2018 |

OTHER PUBLICATIONS

International Search Report and Written Opinion date Dec. 25, 2019 in International Application No. PCT/CN2019/080272. English translation attached.

(Continued)

*Primary Examiner* — Chuong T Ho
(74) *Attorney, Agent, or Firm* — Sheppard, Mullin, Richter & Hampton LLP

(57) ABSTRACT

The embodiments of the present disclosure provide a communication method in a V2X system, a terminal device, and a network device, capable of improving the reliability of sidelink data transmission in the V2X system. The communication method in the V2X system includes: transmitting, by a terminal device, a channel occupancy ratio of the terminal device to a network device.

20 Claims, 5 Drawing Sheets

(56) References Cited

U.S. PATENT DOCUMENTS

2021/0337426 A1* 10/2021 Lee .................. H04W 74/0816
2022/0061055 A1*  2/2022 Freda ................... H04W 72/53

OTHER PUBLICATIONS

Fraunhofer HHI et al., "Resource Pool Sharing between Mode 3 and Mode 4 UEs". 3GPP TSG RAN WG2 Meeting #101 bis R2-1805403, Revision of R2-1803342, dated Apr. 16, 2018, Section 3 and 4 of the text, 7 pages.
Qualcomm Incorporated. "On remaining issues in TX carrier selection for CA in eV2X". 3GPP TSG-RAN2 Meeting 101bis R2-1804873, dated Apr. 16, 2018, full text, 4 pages.

* cited by examiner

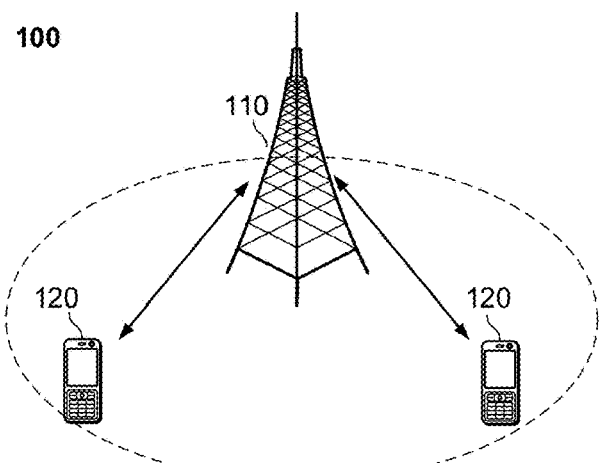

FIG. 1A

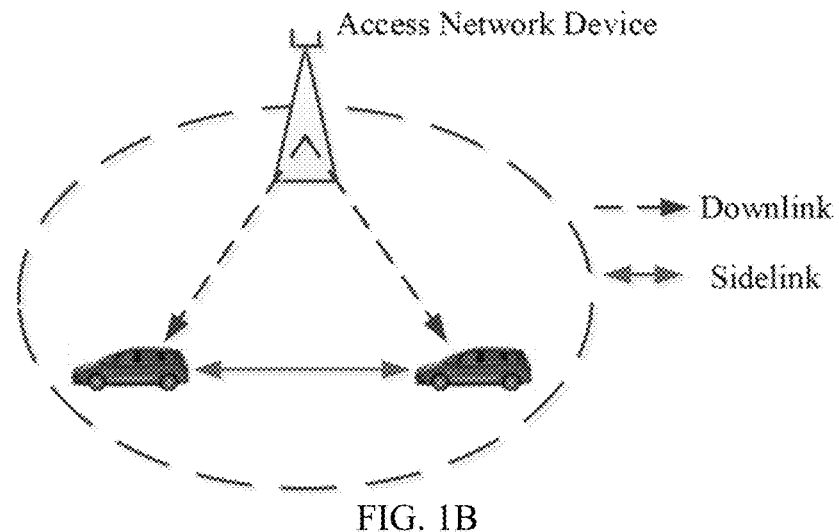

A terminal device transmits a channel occupancy ratio of the terminal device to a network device. — 210

After receiving the channel occupancy ratio of the terminal device transmitted by the terminal device, the network device performs a transmission resource allocation control process for the terminal device based on the channel occupancy ratio of the terminal device. — 220

FIG. 2A 300
310 — A network device configures a transmission parameter range for the terminal device based on at least one of a channel busy ratio and a fifth parameter of sidelink data
320 — The terminal device selects one or more transmission parameters from the transmission parameter range for transmitting the sidelink data
FIG. 3
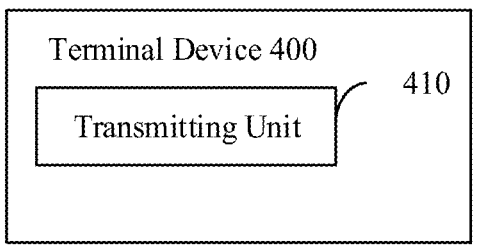
FIG. 4A
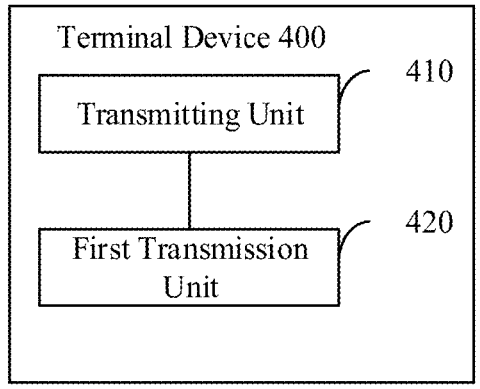
FIG. 4B

COMMUNICATION METHOD IN V2X SYSTEM, TERMINAL DEVICE AND NETWORK DEVICE

CROSS-REFERENCE TO RELATED APPLICATION

The present application is a continuation of International Application No. PCT/CN2019/080272, filed on Mar. 28, 2019, which is incorporated herein by reference in its entirety.

TECHNICAL FIELD

The embodiments of the present disclosure relates to communication technology, and more particularly, to a communication method in a Vehicle to Everything (V2X) system, a terminal device, and a network device.

BACKGROUND

Communications in a Vehicle to Everything (V2X) system use a sidelink (SL) transmission technology. Unlike the traditional wireless communication system in which data is received or transmitted via a network device, the V2X system uses a terminal device to terminal device, or Device to Device (D2D), direct communication scheme and thus has higher spectrum efficiency and lower transmission delay.

In a V2X system based on a wireless communication system such as New Radio (NR) system, e.g., an NR-V2X system, a terminal device can operate in a transmission mode 1 and a transmission mode 2 simultaneously. The terminal device can use a transmission resource allocated by the network device to transmit sidelink data in the transmission mode 1, or can autonomously select a transmission resource from a resource pool to transmit sidelink data in the mode 2.

However, since the network device is not aware of the transmission resource selected by the terminal device, the network device cannot allocate appropriate transmission resources to the terminal device, such that the sidelink data transmitted by the terminal device may be blocked, resulting in a degraded reliability of sidelink data transmission in the V2X system.

SUMMARY

The embodiments of the present disclosure provide a communication method in a V2X system, a terminal device, and a network device, capable of improving the reliability of sidelink data transmission in the V2X system.

In a first aspect, a communication method in a V2X system is provided. The method includes: transmitting, by a terminal device, a channel occupancy ratio of the terminal device to a network device.

In a second aspect, another communication method in a V2X system is provided. The method includes: receiving, by a network device, a channel occupancy ratio of a terminal device as transmitted by the terminal device; and performing, by the network device, a transmission resource allocation control process for the terminal device based on the channel occupancy ratio of the terminal device.

In a third aspect, a communication method in a V2X system is provided. The method includes: obtaining, by a terminal device, a transmission parameter range configured by a network device based on at least one of a channel busy ratio and a fifth parameter of sidelink data; and selecting, by the terminal device, one or more transmission parameters from the transmission parameter range for transmitting the sidelink data.

In a fourth aspect, another communication method in a V2X system is provided. The method includes: configuring, by a network device, a transmission parameter range for a terminal device based on at least one of a channel busy ratio and a fifth parameter of sidelink data, for the terminal device to select one or more transmission parameters from the transmission parameter range for transmitting the sidelink data.

In a fifth aspect, a terminal device is provided. The terminal device is configured to perform the method according to the above first aspect or any implementation thereof.

In particular, the terminal device includes one or more functional modules for performing the method according to the above first aspect or any implementation thereof.

In a sixth aspect, a network device is provided. The network device is configured to perform the method according to the above second aspect or any implementation thereof.

In particular, the network device includes one or more functional modules for performing the method according to the above second aspect or any implementation thereof.

In a seventh aspect, a communication device is provided. The communication device includes a processor and a memory. The memory is configured to store a computer program, and the processor is configured to invoke and execute the computer program stored in the memory to perform the method according to any of the above first and second aspects or any implementation thereof.

In an eighth aspect, a terminal device is provided. The terminal device is configured to perform the method according to the above third aspect or any implementation thereof.

In particular, the terminal device includes one or more functional modules for performing the method according to the above third aspect or any implementation thereof.

In a ninth aspect, a network device is provided. The network device is configured to perform the method according to the above fourth aspect or any implementation thereof.

In particular, the network device includes one or more functional modules for performing the method according to the above fourth aspect or any implementation thereof.

In a tenth aspect, a communication device is provided. The communication device includes a processor and a memory. The memory is configured to store a computer program, and the processor is configured to invoke and execute the computer program stored in the memory to perform the method according to any of the above third and fourth aspects or any implementation thereof.

In an eleventh aspect, a chip is provided. The chip is configured to perform any of the above first to fourth aspects or any implementation thereof.

In particular, the chip includes a processor configured to invoke and execute a computer program from a memory, to enable a device provided with the chip to perform the method according to any of the above first to fourth aspects or any implementation thereof.

In a twelfth aspect, a computer-readable storage medium is provided. The computer-readable storage medium is configured to store a computer program that enables a computer to perform the method according to any of the above first to fourth aspects or any implementation thereof.

In a thirteenth aspect, a computer program product is provided. The computer program product includes computer program instructions that cause a computer to perform the method according to any of the above first to fourth aspects or any implementation thereof.

In a fourteenth aspect, a computer program is provided. The computer program, when executed by a computer, causes the computer to perform the method according to any of the above first to fourth aspects or any implementation thereof.

With the above technical solutions, on one hand, a terminal device can transmit a channel occupancy ratio of the terminal device to a network device, such that the network device can clearly know the channel usage of the terminal device, and then allocate appropriate transmission resources to the terminal device, thereby avoiding congestion of sidelink data transmitted by the terminal device. In this way, the reliability of the sidelink data transmission in the V2X system can be improved.

With the above technical solutions, on the other hand, a network device can configure a transmission parameter range for a terminal device based on at least one of a channel busy ratio and a fifth parameter of sidelink data, such that the terminal device can obtain one or more transmission parameters based on the transmission parameter range for transmitting the sidelink data, thereby achieving congestion control of the terminal device.

BRIEF DESCRIPTION OF DRAWINGS

FIG. 1A is a schematic diagram of a communication system architecture according to an embodiment of the present disclosure.

FIG. 1B is a schematic diagram of a V2X system architecture according to an embodiment of the present disclosure.

FIG. 2A is a schematic diagram of a communication method in a V2X system according to an embodiment of the present disclosure.

FIG. 3 is a schematic diagram of another communication method in a V2X system according to an embodiment of the present disclosure.

FIG. 4A is a schematic block diagram of a terminal device according to an embodiment of the present disclosure.

FIG. 4B is a schematic block diagram of a terminal device according to an embodiment of the present disclosure.

DESCRIPTION OF EMBODIMENTS

Figure 2B:
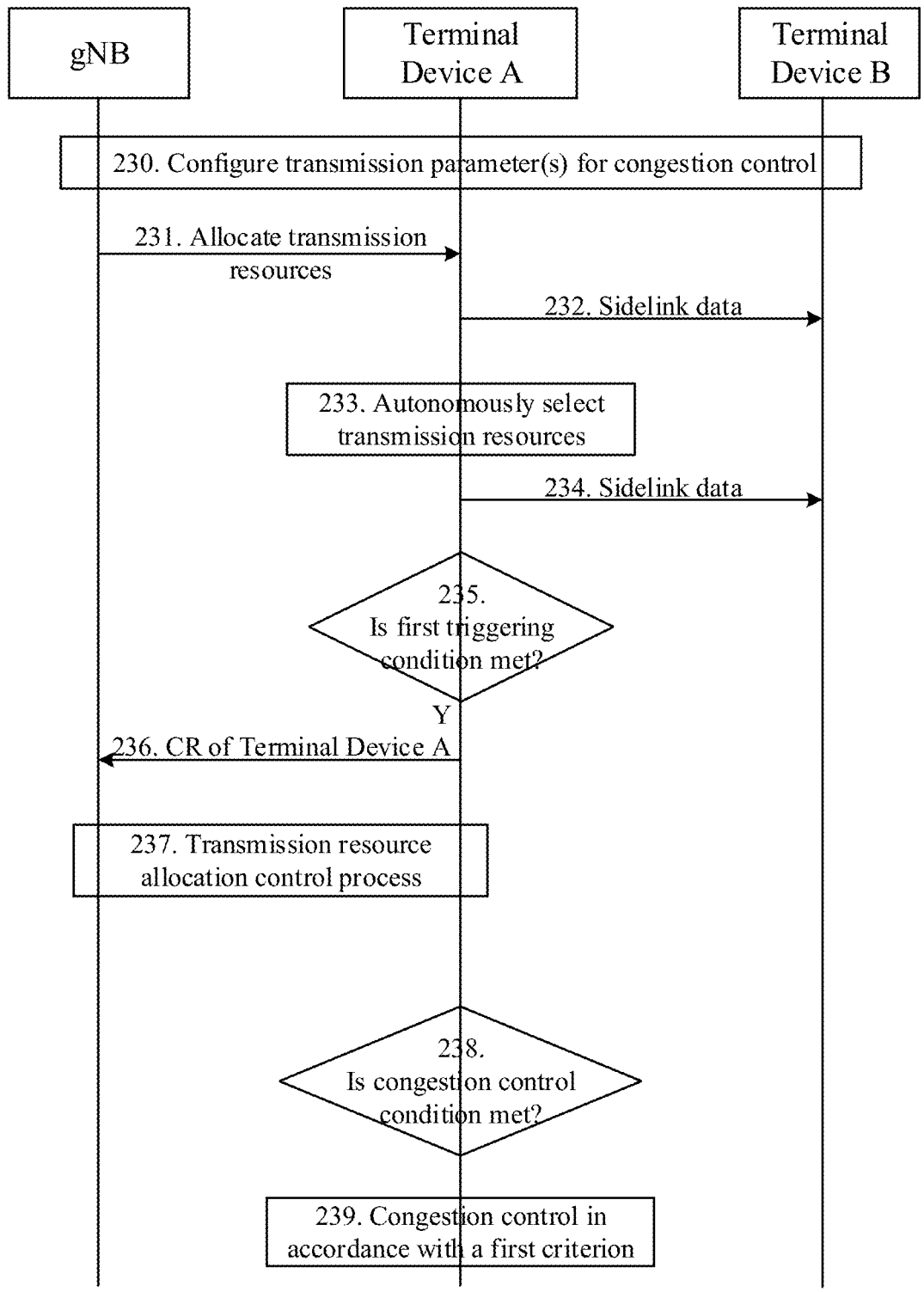
FIG. 2B is a schematic diagram of a communication method in a V2X system according to an embodiment of the present disclosure.

The technical solutions in the embodiments of the present disclosure will be described below with reference to the figure in the embodiments of the present disclosure. Obviously, the described embodiments are only some embodiments, rather than all embodiments, of the present disclosure. All other embodiments obtained by those skilled in the art based on the embodiments in the present disclosure without inventive efforts are to be encompassed by the scope of the present disclosure.

The technical solutions according to the embodiments of the present disclosure can be applied to various communication systems, including for example: Global System of Mobile Communication (GSM), Code Division Multiple Access (CDMA) system, Wideband Code Division Multiple Access (WCDMA) system, General Packet Radio Service (GPRS), Long Term Evolution (LTE) system, LTE Frequency Division Duplex (FDD) system, LTE Time Division Duplex (TDD) system, Universal Mobile Telecommunication System (UMTS), Worldwide Interoperability for Microwave Access (WiMAX) communication system, or the $5^{th}$ Generation (5G) system.

A communication system 100 where an embodiment of the present disclosure can be applied is shown in FIG. 1A. The communication system 100 may include a network device 110. The network device 110 may be a device that can communicate with a terminal device (or referred to as communication terminal or terminal) 120. The network device 110 may provide communication coverage for a particular geographic area, and may communicate with terminal devices located in the coverage area. In at least one embodiment, the network device 110 may be a base station such as Base Transceiver Station (BTS) in a GSM system or a CDMA system, a base station such as NodeB (NB) in a WCDMA system, a base station such as Evolutional Node (eNB or eNodeB) in an LTE system, or a radio controller in a Cloud Radio Access Network (CRAN). Alternatively, the network device may be a mobile switch center, a relay station, an access point, a vehicle-mounted device, a wearable device, a hub, a switch, a network bridge, a router, a network side device in a 5G network, or a network device in a future evolved Public Land Mobile Network (PLMN).

The communication system 100 further includes at least one terminal device 120 located within the coverage of the network device 110. As used herein, the term "terminal device" may include, but not limited to, an apparatus connected via a wired line, e.g., via a Public Switched Telephone Network (PSTN), a Digital Subscriber Line (DSL), a digital cable, or a direct cable connection, and/or via another data connection/network, and/or via a wireless interface, e.g., for a cellular network, a Wireless Local Area Network (WLAN), a digital TV network such as a DVB-H network, a satellite network, an AM-FM broadcast transmitter, and/or another terminal device, and configured to receive/transmit communication signals, and/or an Internet of Things (IoT) device. A terminal device configured to communicate via a wireless interface may be referred to as a "wireless communication terminal", a "wireless terminal", or a "mobile terminal". Examples of the mobile terminal may include, but not limited to, a satellite or cellular phone, a Personal Communications System (PCS) terminal combining cellular radio phone with data processing, fax, and data communication capabilities, a PDA including a radio phone, a pager, Internet/intranet access, a Web browser, a memo pad, a calendar, and/or a Global Positioning System (GPS) receiver, or a conventional laptop and/or palmtop receiver or another electronic device including a radio telephone transceiver. The terminal device may be an access terminal, a User Equipment (UE), a user unit, a user station, a mobile station, a mobile device, a remote station, a remote terminal, a mobile device, a user terminal, a terminal, a wireless communication device, a user agent, or a user device. Alternatively, the access terminal can be a cellular phone, a cordless phone, a Session Initiation Protocol (SIP) phone, a Wireless Local Loop (WLL) station, a Personal Digital Assistant (PDA), a handheld device or a computing device having a wireless communication function, another processing device connected to a wireless modem, a vehicle-mounted device, a wearable device, a terminal device in a 5G network, or a terminal devices in a future evolved PLMN, etc.

In at least one embodiment, direct communication, such as Device to Device (D2D) communication, may be performed between the terminal devices 120.

In at least one embodiment, the 5G system or network may also be referred to as a New Radio (NR) system or network.

In the Vehicle to Everything (V2X) system, direct communication between terminal devices is adopted, which has higher spectrum efficiency and lower transmission delay. The communication between the terminal devices can be relayed by an access network device via a Uu interface, or can be performed directly via a PC5 interface, as shown in FIG. 1B.

FIG. 1A exemplarily shows one network device and two terminal devices. In at least one embodiment, the communication system 100 may include a plurality of network devices and the coverage of each network device may include a different number of terminal devices. The embodiment of the present disclosure is not limited to this.

In at least one embodiment, the communication system 100 may also include other network entities such as a network controller and a mobility management entity, and the embodiment of the present disclosure is not limited to this.

It can be appreciated that, in the embodiment of the present disclosure, a device with a communication function in a network/system may be referred to as a communication device. For the communication system 100 shown in FIG. 1A as an example, communication devices may include the network device 110 and the terminal devices 120, each having a communication function. The network device 110 and the terminal devices 120 may be e.g., any of the specific devices described above, and details thereof will be omitted here. The communication device may also include other devices in the communication system 100, such as a network controller, a mobility management entity, and other network entities, and the embodiment of the present disclosure is not limited to this.

It is to be noted that the terms "system" and "network" are often used interchangeably herein. The term "and/or" as used herein only represents a relationship between correlated objects, including three relationships. For example, "A and/or B" may mean A only, B only, or both A and B. In addition, the symbol "/" as used herein represents an "or" relationship between the correlated objects preceding and succeeding the symbol.

Two transmission modes are defined in the 3GPP: Transmission Mode A and Transmission Mode B.

Transmission mode A: Transmission resources for the terminal device are allocated by the network device. The terminal device transmits sidelink data on the sidelink according to the transmission resources allocated by the network device. The network device can allocate a transmission resource for a single transmission to the terminal, or allocate transmission resources for semi-static transmissions to the terminal.

Transmission mode B: The terminal device autonomously selects a transmission resource in a resource pool to transmit sidelink data.

When there are a large number of users in the system, congestion may occur in the system, which will increase the conflict between users and reduce the overall performance of the system. Therefore, a congestion control mechanism is introduced in the LTE-V2X system. In the LTE-V2X system, two quantities related to congestion control are introduced: Channel Busy Ratio (CBR) and Channel Occupancy Ratio (CR).

CBR: The terminal device calculates a ratio of the transmission resource where a Sidelink Received Signal Strength Indicator (S-RSSI) exceeds a certain threshold within a time period to the total transmission resources within the time period. This parameter is used to describe the overall resource utilization of the system. The terminal device can calculate the S-RSSI on each subband within a time period of [n−100, n−1] time units, and if the S-RSSI exceeds the threshold, the number of occupied resources is incremented by one. The ratio of the total number of occupied resources within the time period of [n−100, n−1] time units to the total number of subbands in the time period is calculated as the CBR of the terminal device. Here, the time unit may be a time slot, a subframe, etc. A subband includes N continuous Physical Resource Blocks (PRBs) in the frequency domain.

CR is used to evaluate the amount of resources occupied by the terminal device itself. This parameter is a ratio of the sum of transmission resources used by the terminal device in the time period of [n−a, n−1] and transmission resources to be used by the terminal device in the time period of [n, n+b] time units to all transmission resources in the time period of [n−a, n+b] time units. This parameter is used to describe the amount of resources used by the terminal device. Here, the time unit may be a time slot, a subframe, etc. For example, the terminal device may use 2 subbands in the time period of [n−a, n−1] time units, and is to use 1 subband in the time period of [n, n+b] time units. In this case, the amount of transmission resources used by the terminal within the time period of [n−a, n+b] time units is 3 subbands, which can be divided by the total number of subbands in the time period of [n, n+b] time units to obtain the channel occupancy ratio of the terminal device.

In the LTE-V2X system, two transmission modes are defined: Transmission Mode 3 (i.e., the above Transmission Mode A) and Transmission Mode 4 (i.e., the above Transmission Mode B). A terminal can only operate in one of the transmission modes at a time. In Transmission Mode 3, the transmission resources used by a terminal device are all configured by a network device. Since the network device can know how many transmission resources are used by the terminal device, the network device can control the channel occupancy ratio of the terminal device not to exceed the limit of the maximum CR by means of resource allocation. In Transmission Mode 4, a terminal device selects transmission resources autonomously, so the terminal device can learn the CR. When the used transmission resources exceed the CR limit, the terminal device will discard one or more data packets.

Therefore, in Transmission Mode 3 and Transmission Mode 4, the network device and the terminal device can control the usage of transmission resources respectively to prevent the channel occupancy ratio from exceeding the limit.

However, in the NR-V2X system, Transmission Mode 1 (i.e., the above Transmission Mode A) and Transmission Mode 2 (i.e., the above Transmission Mode B) are introduced, and a terminal can operate in Transmission Mode 1 and Transmission Mode 2 simultaneously. For example, a terminal device may perform a broadcast transmission and a unicast transmission simultaneously. Transmission resources for the broadcast transmission may be selected based on Transmission Mode 2, and transmission resources for unicast transmission may be selected based on Transmission Mode 1. In this case, the network device can allocate transmission resources for the terminal device, while the terminal device can also select transmission resources autonomously.

However, since the network device is not aware of the transmission resources selected by the terminal device, the network device cannot allocate appropriate transmission resources to the terminal device, such that sidelink data transmitted by the terminal device may be blocked, resulting in a degraded reliability of sidelink data transmission in the V2X system.

FIG. 2A is a schematic flowchart of a communication method 200 in a V2X system according to an embodiment of the present disclosure, as shown in FIG. 2A.

At 210, a terminal device transmits a Channel Occupancy Ratio (CR) of the terminal device to a network device.

The network device in the present disclosure may be a mobility management device, e.g., an Access and Mobility Management Function (AMF) in a 5G core network (i.e., Next Generation Core Network, or NGCN) or a Mobility Management Entity (MME) in a 4G core network (i.e., Evolved Packet Core Network, or EPC), or a policy control device, e.g., a Vehicle to Everything Control Function (V2X CF) or a Policy Control Function (PCF), etc. This embodiment is not limited to any of these specific examples.

Here, the network structure not only supports the V2X CF as a standalone network element, but also supports the function of the V2X CF to be incorporated in the PCF. This embodiment is not limited to any of these specific examples.

In at least one embodiment, in a possible implementation of this embodiment, the channel occupancy ratio of the terminal device may be a channel occupancy ratio of the terminal device operating in a first transmission mode, or a channel occupancy ratio of the terminal device operating in a second transmission mode, or a channel occupancy ratio of the terminal device operating in the first transmission mode and the second transmission mode. This embodiment is not limited to any of these examples. Here, the first transmission mode, i.e., Transmission Mode A, refers to the transmission mode in which the network device allocates transmission resources to the terminal device, and the second transmission mode, i.e., Transmission Mode B, refers to a transmission mode in which the terminal device selects transmission resources autonomously.

In at least one embodiment, the second transmission mode may refer to a transmission mode in which another terminal device (e.g., a group head terminal) allocates transmission resources to the terminal device.

In at least one embodiment, in a possible implementation of this embodiment, in 210, the channel occupancy ratio of the terminal device may be carried in terminal device assistance information (UEAssistanceInformation), in Radio Resource Control (RRC) signaling, in a Buffer Status Report (BSR), or in any other message transmitted to the network device. This embodiment is not limited to any of these examples.

In at least one embodiment, in a possible implementation of this embodiment, the channel occupancy ratio of the terminal device may include a channel occupancy ratio of the terminal device within a time period of [n−p, n+q] time units. The terminal device can calculate the channel occupancy ratio of the terminal device within the time period of [n−p, n+q] time units. Here, the parameter p can be 0 or a positive integer, the parameter q can be −1, 0 or a positive integer, and the parameter n can be the time at which the terminal device measures the CR, or the time at which the terminal device transmits the CR to the network device. Here, the time unit may be a time slot, a subframe, etc.

The parameter p may be specified in a specification, configured by the network device, or selected by the terminal device autonomously. This embodiment is not limited to any of these examples.

For example, after the terminal device autonomously selects the parameter p, the terminal device may further transmit the parameter p to the network device. In this way, the network device can learn the start time of the calculation time period corresponding to the received channel occupancy ratio of the terminal device.

Similarly, the parameter q may be specified in a specification, configured by the network device, or selected by the terminal device autonomously. This embodiment is not limited to any of these examples.

For example, after the terminal device autonomously selects the parameter q, the terminal device may further transmit the parameter q to the network device. In this way, the network device can learn the end time of the calculation time period corresponding to the received channel occupancy ratio of the terminal device.

It can be appreciated that if the terminal device selects the parameter p and the parameter q autonomously, the terminal device may further transmit both the parameter p and the parameter q to the network device. In this way, the network device can learn the start time and the end time of the calculation time period corresponding to the received channel occupancy ratio of the terminal device.

In at least one embodiment, in a possible implementation of this embodiment, the channel occupancy ratio of the terminal device may be a channel occupancy ratio of the terminal device operating in the first transmission mode within the time period of [n−p, n+q] time units, a channel occupancy ratio of the terminal device operating in the second transmission mode within the time period of [n−p, n+q] time units, or a channel occupancy ratio of the terminal device operating in the first transmission mode and the second transmission mode within the time period of [n−p, n+q] time units. This embodiment is not limited to any of these examples. Here, the time unit may be a time slot, a subframe, etc. Here, the first transmission mode, i.e., Transmission Mode A, refers to the transmission mode in which the network device allocates transmission resources to the terminal device, and the second transmission mode, i.e., Transmission Mode B, refers to a transmission mode in which the terminal device selects transmission resources autonomously.

In at least one embodiment, the second transmission mode may refer to a transmission mode in which another terminal device (e.g., a group head terminal) allocates transmission resources to the terminal device.

In at least one embodiment, in a possible implementation of this embodiment, before 210, the terminal device may further obtain a channel occupancy ratio for each of different levels of a first parameter of sidelink data.

In at least one embodiment, when calculating a channel occupancy ratio of a service at a certain level, channel occupancy ratios of services at lower or higher levels may also be included.

Here, the first parameter may include, but not limited to, at least one of: priority, reliability, delay, data rate, communication range, Quality of Service (QoS) Class Identifier (QCI), QoS Flow Identifier (QFI), and PC5 QoS Index (PQI).

For example, when the first parameter is priority, and a defined priority range is [0 7], the terminal device can calculate channel occupancy ratios corresponding to services at different priorities, respectively.

Alternatively, in another example, when the first parameter is QCI (each QCI may correspond to a set of parameters), and a defined QCI index range is [0 7], the terminal device can calculate channel occupancy ratios corresponding to services at different QCI indexes, respectively.

After obtaining the channel occupancy ratio for each of the levels of the first parameter, the terminal device may use any of various schemes to transmit these channel occupancy ratios to the network device.

In a specific implementation, in 210, the terminal device may transmit channel occupancy ratios for all of the levels to the network device.

For example, if the terminal device calculates the channel occupancy ratios corresponding to services at 8 priorities, it may transmit all 8 calculated results to the network device.

In another specific implementation, in 210, the terminal device may transmit channel occupancy ratios for a part of the levels to the network device.

For example, if the terminal device calculates the channel occupancy ratios corresponding to services at 8 priorities, only a part of the calculated results may be selected. For example, the channel occupancy ratios corresponding to the services at priorities 0-3 can be transmitted to the network device.

In another specific implementation, in 210, the terminal device may transmit, based on configuration information, the channel occupancy ratios for one or more levels indicated by the configuration information to the network device. Here, the configuration information is transmitted by the network device.

For example, the configuration information transmitted by the network device may instruct the terminal device to transmit the channel occupancy ratios corresponding to services at all levels, or instruct the terminal device to transmit the channel occupancy ratios corresponding to services at some levels, or instruct the terminal device to transmit a channel occupancy ratio corresponding to a service at a certain level.

Alternatively, in another example, the configuration information transmitted by the network device may include a threshold, and the terminal device may transmit a channel occupancy ratio corresponding to a service at a level higher or lower than the threshold.

In at least one embodiment, in a possible implementation of this embodiment, in 210, when a first triggering condition is met, the terminal device can be triggered to perform 210, i.e., the terminal device can transmit the channel occupancy ratio of the terminal device to the network device.

Here, the first triggering condition may include, but not limited to, at least one of:
whether the terminal device receives first indication information transmitted by the network device,
whether the channel occupancy ratio of the terminal device is greater than a first threshold,
whether a channel busy ratio measured by the terminal device is greater than a second threshold,
a reporting period,
expiry of a timer, and
whether a counter reaches a third threshold.

In a specific implementation, the first triggering condition may be whether the terminal device receives the first indication information transmitted by the network device. If the terminal device receives the first indication information transmitted by the network device, the first triggering condition is met. Then, the terminal device may transmit the channel occupancy ratio of the terminal device to the network device in accordance with the first indication information. Here, the first indication information may be transmitted by the network device.

Specifically, the network device may transmit the first indication information to the terminal device to instruct the terminal device to transmit the channel occupancy ratio of the terminal device to the network device.

After receiving the first indication information, the terminal device may transmit the channel occupancy ratio of the terminal device to the network device in accordance with the first indication information.

Specifically, the network device may transmit the first indication information to the terminal device via at least one of a system broadcast message, higher layer signaling, and physical layer signaling.

For example, the existing Master Information Block (MIB) or System Information Block (SIB) in the system broadcast message can be used to carry the first indication information, or a new SIB can be added to carry the first indication information.

Alternatively, in another example, the higher layer signaling may be a Radio Resource Control (RRC) message, and the first indication information may be carried in an Information Element (IE) in the RRC message. The RRC message may be an existing RRC message, e.g., an RRC CONNECTION RECONFIGURATION message or the like. This embodiment is not limited to any specific example. An IE of the existing RRC message may be extended to carry the first indication information, or alternatively the RRC message may be different from the existing RRC message.

Alternatively, in another example, the higher layer signaling may be a Media Access Control (MAC) Control Element (CE) message. Specifically, a new MAC CE message may be added to carry the first indication information.

Alternatively, in another example, the physical layer signaling may be Downlink Control Information (DCI). Specifically, the first indication information may be carried in the DCI.

In an implementation, the first indication information may further include at least one of the parameter p and the parameter q, for indicating a time period of [n−p, n+q] time units corresponding to the channel occupancy ratio of the terminal device as transmitted by the terminal device. Here, the time unit may be a time slot, a subframe, etc.

In an implementation, the first indication information may further indicate when operating in which transmission mode the terminal device is to transmit the channel occupancy ratio of the terminal device to the network device.

For example, the first indication information may further indicate that the terminal device is to transmit the channel occupancy ratio of the terminal device operating in the first transmission mode to the network device.

Alternatively, in another example, the first indication information may further instruct that the terminal device is to transmit the channel occupancy ratio of the terminal device operating in the second transmission mode to the network device.

Alternatively, in another example, the first indication information may further indicate that the terminal device is to transmit the channel occupancy ratio of the terminal device operating in the first transmission mode and the second transmission mode to the network device.

In an implementation, the first indication information may further indicate for which level of the first parameter of the sidelink data the terminal device is to transmit the channel occupancy ratio to the network device, i.e., indicating that the terminal device is to transmit the channel occupancy ratio for at least one level of the first parameter of the sidelink data to the network device.

For example, the first indication information may further indicate that the terminal device is to transmit channel occupancy ratios for all the levels of the first parameter to the network device.

Alternatively, in another example, the first indication information may further indicate that the terminal device is to transmit channel occupancy ratios for a part of the levels of the first parameter to the network device.

Alternatively, in another example, the first indication information may further indicate that the terminal device is to transmit a channel occupancy ratio for a certain level of the first parameter to the network device.

In an implementation, the first indication information may further indicate that the terminal device is to transmit a channel busy ratio to the network device.

In another specific implementation, the first triggering condition may be whether the channel occupancy ratio of the terminal device is greater than a first threshold. If the channel occupancy ratio of the terminal device is greater than the first threshold, then the first triggering condition is met, and the terminal device may transmit the channel occupancy ratio of the terminal device to the network device.

The first threshold may be a uniform value, or may be different values. For example, different first parameters may correspond to different first thresholds. This embodiment is not limited to any specific example.

The first threshold may be specified in a specification, or may be configured by the network device. This embodiment is not limited to any of these examples.

For example, if the channel occupancy ratio of the terminal device operating in the second transmission mode is greater than the first threshold, the terminal device may be triggered to perform 210.

Alternatively, in another example, if the channel occupancy ratio of the terminal device operating in the first transmission mode and the second transmission mode is greater than the first threshold, the terminal device may be triggered to perform 210.

In an implementation, if the channel occupancy ratio of the terminal device is greater than the first threshold, or the channel busy ratio measured by the terminal device is greater than the second threshold, the terminal device may further transmit second indication information to the network device. The second indication information indicates that the channel occupancy ratio of the terminal device is greater than the first threshold, or the channel busy ratio measured by the terminal device is greater than the second threshold.

Specifically, the second indication information can be carried in terminal device assistance information (UEAssistanceInformation), in Radio Resource Control (RRC) signaling, in a Buffer Status Report (BSR), or in any other message. This embodiment is not limited to any of these examples.

In another specific implementation, the first triggering condition may be whether the channel busy ratio measured by the terminal device is greater than a second threshold. If the channel busy ratio measured by the terminal device is greater than the second threshold, then the first triggering condition is met, and the terminal device may transmit the channel occupancy ratio of the terminal device to the network device.

Here, the second threshold may be specified in a specification, or may be configured by the network device. This embodiment is not limited to any of these examples.

In another specific implementation, the first triggering condition may be a reporting period. If the reporting period is satisfied, the first triggering condition is met. Then, the terminal device may transmit the channel occupancy ratio of the terminal device to the network device according to the reporting period.

Here, the reporting period may be specified in a specification, or may be configured by the network device. This embodiment is not limited to any of these examples.

In another specific implementation, the first triggering condition may be expiry of a timer. If the timer expires, the first triggering condition is met. Then, the terminal device may transmit the channel occupancy ratio of the terminal device to the network device.

The timer may be specified in a specification, or may be configured by the network device. This embodiment is not limited to any of these examples.

In another specific implementation, the first triggering condition may be whether a counter reaches a third threshold. If the counter reaches the third threshold, the first triggering condition is met. Then, the terminal device may specifically transmit the channel occupancy ratio of the terminal device to the network device based on the counter.

For example, when the terminal device transmits the channel occupancy ratio of the terminal device to the network device, the counter is triggered, and the counter is updated in each time unit (such as time slot or subframe). When the counter reaches the third threshold, the terminal device transmits the channel occupancy ratio of the terminal device to the network device.

Here, the third threshold of the counter may be specified in a specification, or may be configured by the network device. This embodiment is not limited to any of these examples.

For example, when the terminal device transmits the channel occupancy ratio of the terminal device to the network device, the counter may be started. The counter can be set to an initial value, e.g., 20, and the counter can be decremented by one in each time unit (e.g., time slot or subframe). When the counter decreases to the third threshold, e.g., 0, the terminal device can transmit the channel occupancy ratio of the terminal device to the network device again, and reset the counter.

Alternatively, in another example, when the terminal device transmits the channel occupancy ratio of the terminal device to the network device, the counter may be started. The counter can be set to an initial value, such as 0, and the counter may be incremented by one in each time unit (e.g., time slot or a subframe). When the counter increases to the third threshold, e.g., 20, the terminal device can transmit the channel occupancy ratio of the terminal device to the network device again.

Here, the initial value of the counter may be specified in a specification, or may be configured by the network device. This embodiment is not limited to any of these examples.

It can be appreciated that any of the above one or more implementations may be combined to trigger the terminal device to perform 210, i.e., the terminal device to transmit the channel occupancy ratio of the terminal device to the network device.

In at least one embodiment, in a possible implementation of this embodiment, when the channel occupancy ratio of the terminal device is greater than a fourth threshold, the terminal device may further perform congestion control.

The fourth threshold may be specified in a specification, configured by the network device, or determined by the terminal device. This embodiment is not limited to any of these examples.

Specifically, the network device may configure the fourth threshold, such as a maximum CR, and when the CR calculated by the terminal device exceeds the maximum CR, the terminal device may perform congestion control.

Specifically, the terminal device may receive a third parameter and a fourth parameter transmitted by the network device, and then the terminal device may determine the fourth threshold based on the third parameter and the fourth parameter.

For example, the third parameter may be a maximum CR (CR limit), and the fourth parameter may be an offset value. The terminal device may determine the fourth threshold based on the maximum CR and the offset value. For example, if the maximum CR is 0.6 and the offset value is 0.1, the fourth threshold may be 0.6−0.1=0.5. When the CR calculated by the terminal device exceeds 0.5, congestion control can be performed.

Specifically, when the channel occupancy ratio of the terminal device is greater than the fourth threshold, the terminal device may perform congestion control in accordance with a first criterion.

Here, the first criterion may specifically include a number of operation modes, and this embodiment is not limited to any of these examples. The terminal device may use one or more first criteria to perform congestion control.

In a specific implementation, the first criterion may be that the terminal device may perform congestion control in accordance with third indication information transmitted by the network device.

For example, the terminal device may prioritize transmission of the sidelink data that is based on the first transmission mode, and discard the sidelink data that is based on the second transmission mode, in accordance with a processing mode indicated in the third indication information.

Here, the first transmission mode, i.e., Transmission Mode A, refers to the transmission mode in which the network device allocates transmission resources to the terminal device, and the second transmission mode, i.e., Transmission Mode B, refers to a transmission mode in which the terminal device selects transmission resources autonomously.

Alternatively, in another example, the indication information may indicate a fifth threshold, then the terminal device may perform congestion control in accordance with a fifth parameter of sidelink data and the fifth threshold indicated in the third indication information.

The fifth parameter may include, but not limited to, at least one of the following parameters: priority, reliability, delay, data rate, communication range, QCI, QFI, and PQI.

For example, when the priority of the sidelink data is lower than the fifth threshold, the terminal device may discard the sidelink data.

Alternatively, in another example, when the delay requirement parameter of the sidelink data is greater than the fifth threshold, the terminal device may discard the sidelink data.

Alternatively, in another example, if the data rate requirement parameter of the sidelink data is smaller than the fifth threshold, the terminal device may discard the sidelink data.

In another specific implementation, the first criterion may be that the terminal device may prioritize transmission of sidelink data that is based on the first transmission mode, and discard sidelink data that is based on the second transmission mode.

Here, the first transmission mode, i.e., Transmission Mode A, refers to the transmission mode in which the network device allocates transmission resources to the terminal device, and the second transmission mode, i.e., Transmission Mode B, refers to a transmission mode in which the terminal device selects transmission resources autonomously.

In at least one embodiment, the second transmission mode may refer to a transmission mode in which another terminal device (e.g., a group head terminal) allocates transmission resources to the terminal device.

In another specific implementation, the first criterion may be that the terminal device may perform congestion control in accordance with a second parameter of sidelink data to be transmitted.

The second parameter may include, but not limited to, at least one of: priority, reliability, delay, data rate, communication range, QCI, QFI, and PQI.

Specifically, the first criterion may be that the terminal device may perform congestion control by discarding a part of sidelink data in accordance with the second parameter of the sidelink data to be transmitted.

For example, the terminal device can prioritize transmission of high-priority sidelink data and discard low-priority sidelink data. If the CRs are not calculated based on priorities, i.e., the channel occupancy ratios (CRs) of services at all priorities are calculated together, then the terminal device can perform congestion control based on the priorities of the sidelink data.

Alternatively, in another example, if a delay parameter of a first type of sidelink data is 10 ms, and a delay parameter of a second type of sidelink data is 20 ms, the terminal device may prioritize transmission of the first type of sidelink data, and discard the second type of sidelink data.

Alternatively, in another example, if a data rate parameter of a first type of sidelink data is 10 M b/s, and a data rate parameter of a second type of sidelink data is 2 M b/s, the terminal device may prioritize transmission of the first type of sidelink data, and discard the second type of sidelink data.

In another specific implementation, the first criterion may be that the terminal device may discard sidelink data to be transmitted until the channel occupancy ratio of the terminal device becomes smaller than or equal to the fourth threshold.

In an implementation, if the channel occupancy ratio of the terminal device is greater than the fourth threshold, the terminal device may further transmit fourth indication information to the network device. The fourth indication information indicates that the channel occupancy ratio of the terminal device is greater than the fourth threshold.

Specifically, the fourth indication information can be carried in terminal device assistance information (UEAssistanceInformation), in Radio Resource Control (RRC) signaling, in a Buffer Status Report (BSR), or in any other message. This embodiment is not limited to any of these examples.

In an implementation, when the channel occupancy ratio of the terminal device is greater than the fourth threshold, the terminal device may perform congestion control using one or more transmission parameters for congestion control.

The one or more transmission parameters for congestion control may include, but not limited to, at least one of: Modulation and Coding Scheme (MCS), number of PRBs, number of subbands, number of retransmissions, and maximum channel occupancy ratio.

Here, each transmission parameter may be a parameter range, and the terminal device may select corresponding transmission parameter(s) within the parameter range for transmitting sidelink data, so as to achieve congestion control.

For example, the network device can configure a table, and elements in the table can be determined based on a CBR and a level of the fifth parameter. The elements in the table may be configured transmission parameters, such as a range of MCSs, a range of numbers of PRBs, a range of numbers of subbands, a range of numbers of retransmissions, and a maximum channel occupancy ratio.

When the channel occupancy ratio of the terminal device is greater than the fourth threshold, the terminal device may perform congestion control in accordance with one or more transmission parameters configured by the network device. For example, the terminal device can reselect the transmission parameter(s), and the reselected transmission parameter(s) may have a smaller number of PRBs, a smaller number of subbands, a higher level of MCS, or a smaller number of retransmissions.

Here, the one or more transmission parameters for congestion control may be specified in a specification or configured by the network device. This embodiment is not limited to any of these examples.

For example, the one or more transmission parameters for congestion control may be configured by the network device based on a CBR of the terminal device.

Alternatively, in another example, the one or more transmission parameters for congestion control may be configured by the network device based on a fifth parameter of the sidelink data.

Alternatively, in another example, the one or more transmission parameters for congestion control may be configured by the network device based on the CBR of the terminal device and the fifth parameter of the sidelink data.

In NR-V2X, different QoS parameters are introduced. Therefore, the network device needs to configure the transmission parameter(s) based on a new QoS parameter, i.e., the fifth parameter.

The fifth parameter may include, but not limited to, at least one of: priority, PQI, QCI, QFI, bearer, logical channel, communication range, data rate, and reliability.

Priority: It can be a ProSe Per-Packet Priority (PPPP), having a value range of [0, 7]. The lower the value of PPPP, the higher the priority.

PQI: The network device can configure transmission parameters for different PQI parameters. Here, one PQI index corresponds to a set of parameters. In at least one embodiment, the transmission parameter(s) configured by the network device may be configured based on a particular parameter in the PQI.

QCI: The network device can configure transmission parameters for different QCI parameters.

QFI: The network device can configure transmission parameters for different QFI parameters.

Bearer: The network device can configure transmission parameters for different bearers.

Logical Channel: The network device can configure transmission parameters for different logical channels.

Communication Range: The network device can configure transmission parameters for different communication ranges.

Transmission rate (data rate): The network device can configure transmission parameters for different transmission rates.

Reliability: The network device can configure transmission parameters for different reliabilities.

In at least one embodiment, in a possible implementation of this embodiment, when the channel occupancy ratio of the terminal device is greater than a sixth threshold, the terminal device may further directly discard sidelink data to be transmitted until the channel occupancy ratio of the terminal device becomes smaller than or equal to the sixth threshold.

The sixth threshold may be specified in a specification, or may be configured by the network device. This embodiment is not limited to any of these examples.

Specifically, the network device may configure the sixth threshold. When the CR calculated by the terminal device exceeds the sixth threshold, the terminal device may directly discard the sidelink data to be transmitted until the channel occupancy ratio of the terminal device becomes smaller than or equal to the sixth threshold.

At 220, after the network device receives the channel occupancy ratio of the terminal device transmitted by the terminal device, the network device performs a transmission resource allocation control process for the terminal device based on the channel occupancy ratio of the terminal device.

Specifically, the network device can allocate appropriate transmission resources to the terminal device operating in the first transmission mode, i.e., Transmission Mode A, based on the received channel occupancy ratio of the terminal device, so as to effectively avoid the occurrence of congestion.

In at least one embodiment, in a possible implementation of this embodiment, the terminal device may further transmit a channel busy ratio measured by the terminal device to the network device, before, in parallel with, or after performing 210.

In this way, in addition to the terminal device transmitting the channel occupancy ratio of the terminal device to the network device, the channel busy ratio measured by the terminal device can also be transmitted to the network device, such that the network device can learn both the channel busy ratio and the channel occupancy ratio of the terminal device at the same time for congestion control, e.g., reconfiguration of one or more transmission parameters.

In the following, the technical solution according to the present disclosure will be described in detail with reference to an example where Terminal Device A operates in Transmission Mode 1 and Transmission Mode 2 simultaneously in an NR-V2X system, as shown in FIG. 2B.

At 230, a gNB configures one or more transmission parameters for congestion control for Terminal Device A and Terminal Device B.

The one or more transmission parameters for congestion control may include, but not limited to, at least one of: MCS, number of PRBs, number of subbands, number of retransmissions, and maximum CR.

At 231, the gNB allocates transmission resources for Terminal Device A.

At 232, Terminal Device A uses the allocated transmission resources, and transmits sidelink data to Terminal Device B in accordance with one or more transmission parameters selected in a transmission parameter range configured by the gNB and/or the one or more transmission parameters allocated by the gNB.

At 233, Terminal device A selects transmission resources autonomously.

At 234, Terminal Device A transmits sidelink data to Terminal Device B in accordance with the autonomously selected transmission resources and one or more transmission parameters selected in a transmission parameter range configured by the gNB.

At 235, Terminal Device A determines whether a first triggering condition is met.

For example, Terminal Device A determines whether a CR of Terminal Device A needs to be transmitted according to first instruction information transmitted by the gNB. If so, the first triggering condition is met.

Alternatively, in another example, Terminal Device A determines whether the CR of Terminal Device A is greater than a first threshold. If so, the first triggering condition is met.

Alternatively, in another example, Terminal Device A determines whether a CBR is greater than a second threshold. If so, the first triggering condition is met.

Alternatively, in another example, Terminal Device A determines whether a reporting period is reached. If so, the first triggering condition is met.

Alternatively, in another example, Terminal Device A determines whether a timer expires. If so, the first triggering condition is met.

Alternatively, in another example, Terminal Device A determines whether a counter reaches a third threshold. If so, the first triggering condition is met.

At 236, when the first triggering condition is met, Terminal Device A transmits the CR of Terminal Device A to the gNB.

If Terminal Device A determines that the CR of Terminal Device A is greater than the first threshold in 235, then in 236, Terminal Device A may further transmit second indication information to the gNB to indicate that the CR of Terminal Device A is greater than the first threshold.

In at least one embodiment, Terminal Device A may further transmit a CBR measured by Terminal Device A to the gNB.

At 237, after receiving the CR of Terminal Device A transmitted by Terminal Device A, the gNB can perform a transmission resource allocation control process for Terminal Device A based on the CR of Terminal Device A.

At 238, Terminal Device A determines whether a congestion control condition is met.

Specifically, Terminal Device A determines whether the CR of Terminal Device A is greater than a fourth threshold. If so, the congestion control condition is met.

At 239, if the congestion control condition is met, Terminal Device A performs congestion control in accordance with a first criterion.

For detailed description of the first criterion, reference can be made to the related content above.

As such, since the gNB can clearly know the channel usage of Terminal Device A, and then allocate appropriate transmission resources to Terminal Device A, it is possible to prevent sidelink data transmitted by Terminal Device A from being blocked, thereby improving the reliability of sidelink data transmission in the V2X system.

In this embodiment, the terminal device can transmit the channel occupancy ratio of the terminal device to the network device, such that the network device can clearly know the channel usage of the terminal device, and then allocate appropriate transmission resources to the terminal device, thereby avoiding congestion of sidelink data transmitted by the terminal device. In this way, the reliability of the sidelink data transmission in the V2X system can be improved.

FIG. 3 is a schematic flowchart of a communication method 300 in a V2X system according to an embodiment of the present disclosure, as shown in FIG. 3.

At 310, a network device configures a transmission parameter range for the terminal device based on at least one of a channel busy ratio and a fifth parameter of sidelink data.

At 320, the terminal device selects one or more transmission parameters from the transmission parameter range for transmitting the sidelink data.

The network device in the present disclosure may be a mobility management device, e.g., an Access and Mobility Management Function (AMF) in a 5G core network (i.e., Next Generation Core Network, or NGCN) or a Mobility Management Entity (MME) in a 4G core network (i.e., Evolved Packet Core Network, or EPC), or a policy control device, e.g., a Vehicle to Everything Control Function (V2X CF) or a Policy Control Function (PCF), etc. This embodiment is not limited to any of these specific examples.

Here, the network structure not only supports the V2X CF as a standalone network element, but also supports the function of the V2X CF to be incorporated in the PCF. This embodiment is not limited to any of these specific examples.

The one or more transmission parameters configured by the network device for the terminal device may include, but not limited to, at least one of: Modulation and Coding Scheme (MCS), number of PRBs, number of subbands, number of retransmissions, and maximum channel occupancy ratio.

Here, each transmission parameter may be a parameter range, and the terminal device may select the transmission parameter(s) within the parameter range for transmitting the sidelink data, so as to perform congestion control.

For example, the network device can configure a table, and elements in the table can be determined based on a CBR and a level of the fifth parameter. The elements in the table may be configured transmission parameters, such as a range of MCSs, a range of numbers of PRBs, a range of numbers of subbands, a range of numbers of retransmissions, and a maximum channel occupancy ratio.

For example, the one or more transmission parameters may be configured by the network device based on a CBR of the terminal device.

Alternatively, in another example, the one or more transmission parameters may be configured by the network device based on the fifth parameter of the sidelink data.

Alternatively, in another example, the one or more transmission parameters may be configured by the network device based on the CBR of the terminal device and the fifth parameter of the sidelink data.

In NR-V2X, different QoS parameters are introduced. Therefore, the network device needs to configure the transmission parameter(s) based on a new QoS parameter, i.e., the fifth parameter.

The fifth parameter may include, but not limited to, at least one of: priority, PQI, QCI, QFI, bearer, logical channel, communication range, data rate, and reliability.

Priority: It can be a ProSe Per-Packet Priority (PPPP), having a value range of [0, 7]. The lower the value of PPPP, the higher the priority.

PQI: The network device can configure transmission parameters for different PQI parameters. Here, one PQI index corresponds to a set of parameters. In at least one embodiment, the transmission parameter(s) configured by the network device may be configured based on a particular parameter in the PQI.

QCI: The network device can configure transmission parameters for different QCI parameters.

QFI: The network device can configure transmission parameters for different QFI parameters.

Bearer: The network device can configure transmission parameters for different bearers.

Logical Channel: The network device can configure transmission parameters for different logical channels.

Communication Range: The network device can configure transmission parameters for different communication ranges.

Transmission rate (data rate): The network device can configure transmission parameters for different transmission rates.

Reliability: The network device can configure transmission parameters for different reliabilities.

In this embodiment, the network device can configure the transmission parameter range for the terminal device based on at least one of the channel busy ratio and the fifth parameter of sidelink data, such that the terminal device can obtain one or more transmission parameters based on the transmission parameter range for transmitting the sidelink data, thereby achieving congestion control of the terminal device.

FIG. 4A is a schematic block diagram of a terminal device 400 according to an embodiment of the present disclosure, as shown in FIG. 4A. This embodiment provides a terminal device 400 for performing the method performed by the terminal device in the embodiment corresponding to FIG. 2A.

Specifically, the terminal device 400 includes functional modules for performing the method performed by the terminal device in the embodiment corresponding to FIG. 2A. The terminal device 400 may include a transmitting unit 410 configured to transmit a channel occupancy ratio of the terminal device to a network device.

The network device in the present disclosure may be a mobility management device, e.g., an Access and Mobility Management Function (AMF) in a 5G core network (i.e., Next Generation Core Network, or NGCN) or a Mobility Management Entity (MME) in a 4G core network (i.e., Evolved Packet Core Network, or EPC), or a policy control device, e.g., a Vehicle to Everything Control Function (V2X CF) or a Policy Control Function (PCF), etc. This embodiment is not limited to any of these specific examples.

Here, the network structure not only supports the V2X CF as a standalone network element, but also supports the function of the V2X CF to be incorporated in the PCF. This embodiment is not limited to any of these specific examples.

In at least one embodiment, in a possible implementation of this embodiment, the channel occupancy ratio of the terminal device may be a channel occupancy ratio of the terminal device operating in a first transmission mode, or a channel occupancy ratio of the terminal device operating in a second transmission mode, or a channel occupancy ratio of the terminal device operating in the first transmission mode and the second transmission mode. This embodiment is not limited to any of these examples. Here, the first transmission mode, i.e., Transmission Mode A, refers to the transmission mode in which the network device allocates transmission resources to the terminal device, and the second transmission mode, i.e., Transmission Mode B, refers to a transmission mode in which the terminal device selects transmission resources autonomously.

In at least one embodiment, the second transmission mode may refer to a transmission mode in which another terminal device (e.g., a group head terminal) allocates transmission resources to the terminal device.

In at least one embodiment, in a possible implementation of this embodiment, the channel occupancy ratio of the terminal device may include a channel occupancy ratio of the terminal device within a time period of [n−p, n+q] time units. The terminal device can calculate the channel occupancy ratio of the terminal device within the time period of [n−p, n+q] time units. Here, the parameter p can be 0 or a positive integer, the parameter q can be −1, 0 or a positive integer, and the parameter n can be the time at which the terminal device measures the CR, or the time at which the terminal device transmits the CR to the network device. Here, the time unit may be a time slot, a subframe, etc.

The parameter p may be specified in a specification, configured by the network device, or selected by the terminal device autonomously. This embodiment is not limited to any of these examples.

For example, after the terminal device autonomously selects the parameter p, the transmitting unit 410 may be further configured to transmit the parameter p to the network device. In this way, the network device can learn the start time of the calculation time period corresponding to the received channel occupancy ratio of the terminal device.

Similarly, the parameter q may be specified in a specification, configured by the network device, or selected by the terminal device autonomously. This embodiment is not limited to any of these examples.

For example, after the terminal device autonomously selects the parameter q, the transmitting unit 410 may be further configured to transmit the parameter q to the network device. In this way, the network device can learn the end time of the calculation time period corresponding to the received channel occupancy ratio of the terminal device.

It can be appreciated that if the terminal device selects the parameter p and the parameter q autonomously, the transmitting unit 410 may be further configured to transmit both the parameter p and the parameter q to the network device. In this way, the network device can learn the start time and the end time of the calculation time period corresponding to the received channel occupancy ratio of the terminal device.

In at least one embodiment, in a possible implementation of this embodiment, the channel occupancy ratio of the terminal device may be a channel occupancy ratio of the terminal device operating in the first transmission mode within the time period of [n−p, n+q] time units, a channel occupancy ratio of the terminal device operating in the second transmission mode within the time period of [n−p, n+q] time units, or a channel occupancy ratio of the terminal device operating in the first transmission mode and the second transmission mode within the time period of [n−p, n+q] time units. This embodiment is not limited to any of these examples. Here, the time unit may be a time slot, a subframe, etc. Here, the first transmission mode, i.e., Transmission Mode A, refers to the transmission mode in which the network device allocates transmission resources to the terminal device, and the second transmission mode, i.e., Transmission Mode B, refers to a transmission mode in which the terminal device selects transmission resources autonomously.

In at least one embodiment, the second transmission mode may refer to a transmission mode in which another terminal device (e.g., a group head terminal) allocates transmission resources to the terminal device.

In at least one embodiment, in a possible implementation of this embodiment, the transmitting unit 410 may be further configured to obtain a channel occupancy ratio for each of different levels of a first parameter of sidelink data.

In at least one embodiment, when calculating a channel occupancy ratio of a service at a certain level, channel occupancy ratios of services at lower or higher levels may also be included.

Here, the first parameter may include, but not limited to, at least one of: priority, reliability, delay, data rate, communication range, Quality of Service (QoS) Class Identifier (QCI), QoS Flow Identifier (QFI), and PC5 QoS Index (PQI).

In a specific implementation, the transmitting unit 410 may be configured to transmit channel occupancy ratios for all of the levels to the network device.

In another specific implementation, the transmitting unit 410 may be configured to transmit channel occupancy ratios for a part of the levels to the network device.

In another specific implementation, the transmitting unit 410 may be configured to transmit, based on configuration information, the channel occupancy ratios for one or more levels indicated by the configuration information to the network device. Here, the configuration information is transmitted by the network device.

In at least one embodiment, in a possible implementation of this embodiment, the transmitting unit 410 may be configured to transmit the channel occupancy ratio of the terminal device to the network device when a first triggering condition is met.

Here, the first triggering condition may include, but not limited to, at least one of:
whether the terminal device receives first indication information transmitted by the network device,
whether the channel occupancy ratio of the terminal device is greater than a first threshold,
whether a channel busy ratio measured by the terminal device is greater than a second threshold,
a reporting period,
expiry of a timer, and
whether a counter reaches a third threshold.

In an implementation, the first indication information may further include at least one of the parameter p and the parameter q, for indicating a time period of [n−p, n+q] time units corresponding to the channel occupancy ratio of the terminal device as transmitted by the transmitting unit 410. Here, the time unit may be a time slot, a subframe, etc.

In an implementation, the first indication information may further indicate at least one of:
the transmitting unit 410 to transmit a channel occupancy ratio of the terminal device operating in a first transmission mode to the network device;
the transmitting unit 410 to transmit a channel occupancy ratio of the terminal device operating in a second transmission mode to the network device; and
the transmitting unit 410 to transmit a channel occupancy ratio for at least one level of a first parameter of sidelink data to the network device.

Here, the first parameter may include, but not limited to, at least one of: priority, reliability, delay, data rate, communication range, QCI, QFI, and PQI.

The first threshold, the second threshold, and the third threshold may be specified in a specification, or may be configured by the network device. This embodiment is not limited to any of these examples.

In an implementation, the first indication information may further indicate that the terminal device is to transmit a channel busy ratio to the network device.

In an implementation, the transmitting unit 410 may be further configured to transmit second indication information to the network device. The second indication information indicates that the channel occupancy ratio of the terminal device is greater than the first threshold or the channel busy ratio measured by the terminal device is greater than the second threshold.

In at least one embodiment, in a possible implementation of this embodiment, as shown in FIG. 4B, the terminal device according to this embodiment may further include a first transmission unit 420 configured to perform congestion control when the channel occupancy ratio of the terminal device is greater than a fourth threshold.

The fourth threshold may be specified in a specification, configured by the network device, or determined by the terminal device. This embodiment is not limited to any of these examples.

Specifically, the first transmission unit 420 may be configured to receive a third parameter and a fourth parameter transmitted by the network device; and determine the fourth threshold based on the third parameter and the fourth parameter.

Specifically, the first transmission unit 420 may be configured to perform congestion control in accordance with a first criterion.

Here, the first criterion may specifically include a number of operation modes, and this embodiment is not limited to any of these examples. The terminal device may use one or more first criteria to perform congestion control.

In a specific implementation, the first criterion may be that the first transmission unit 420 may perform congestion control in accordance with third indication information transmitted by the network device.

For example, the first transmission unit 420 may be configured to prioritize transmission of the sidelink data that is based on the first transmission mode, and discard the sidelink data that is based on the second transmission mode, in accordance with a processing mode indicated in the third indication information.

Here, the first transmission mode, i.e., Transmission Mode A, refers to the transmission mode in which the network device allocates transmission resources to the terminal device, and the second transmission mode, i.e., Transmission Mode B, refers to a transmission mode in which the terminal device selects transmission resources autonomously.

In at least one embodiment, the second transmission mode may refer to a transmission mode in which another terminal device (e.g., a group head terminal) allocates transmission resources to the terminal device.

Alternatively, in another example, the first transmission unit 420 may be configured to perform congestion control in accordance with a fifth parameter of sidelink data and a fifth threshold indicated in the third indication information.

The fifth parameter may include, but not limited to, at least one of the following parameters: priority, reliability, delay, data rate, communication range, QCI, QFI, and PQI.

In another specific implementation, the first criterion may be that the first transmission unit 420 may prioritize transmission of sidelink data that is based on a first transmission mode, and discard sidelink data that is based on a second transmission mode.

Here, the first transmission mode, i.e., Transmission Mode A, refers to the transmission mode in which the network device allocates transmission resources to the terminal device, and the second transmission mode, i.e., Transmission Mode B, refers to a transmission mode in which the terminal device selects transmission resources autonomously.

In at least one embodiment, the second transmission mode may refer to a transmission mode in which another terminal device (e.g., a group head terminal) allocates transmission resources to the terminal device.

In another specific implementation, the first criterion may be that the first transmission unit 420 may perform congestion control in accordance with a second parameter of sidelink data to be transmitted.

The second parameter may include, but not limited to, at least one of: priority, reliability, delay, data rate, communication range, QCI, QFI, and PQI.

In another specific implementation, the first criterion may be that the first transmission unit 420 may discard sidelink data to be transmitted until the channel occupancy ratio of the terminal device becomes smaller than or equal to the fourth threshold.

In an implementation, if the channel occupancy ratio of the terminal device is greater than the fourth threshold, the transmitting unit 410 may be further configured to transmit fourth indication information to the network device. The fourth indication information indicates that the channel occupancy ratio of the terminal device is greater than the fourth threshold.

In an implementation, if the channel occupancy ratio of the terminal device is greater than the fourth threshold, the first transmission unit 420 may perform congestion control using one or more transmission parameters for congestion control.

The one or more transmission parameters for congestion control may include, but not limited to, at least one of: Modulation and Coding Scheme (MCS), number of PRBs, number of subbands, number of retransmissions, and maximum channel occupancy ratio.

Here, each transmission parameter may be a parameter range, and the first transmission unit 420 may select corresponding transmission parameter(s) within the parameter range for transmitting sidelink data, so as to achieve congestion control.

Here, the one or more transmission parameters for congestion control may be specified in a specification or configured by the network device. This embodiment is not limited to any of these examples.

For example, the one or more transmission parameters for congestion control may be configured by the network device based on at least one of a channel busy ratio and a fifth parameter. This embodiment is not limited to any of these examples.

The fifth parameter may include, but not limited to, at least one of: priority, PQI, QCI, QFI, bearer, logical channel, communication range, data rate, and reliability.

Figure 4C:
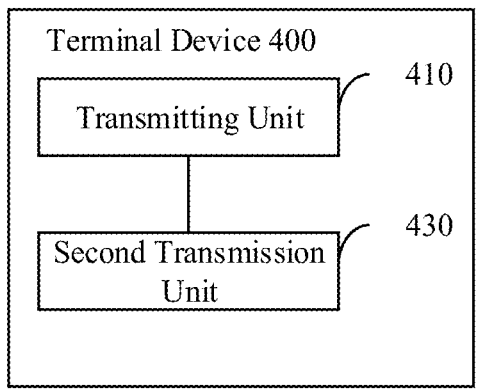
FIG. 4C is a schematic block diagram of a terminal device according to an embodiment of the present disclosure.

In at least one embodiment, in a possible implementation of this embodiment, as shown in FIG. 4C, the terminal device according to this embodiment may further include a second transmission unit 430 configured to discard sidelink data to be transmitted when the channel occupancy ratio of the terminal device is greater than a sixth threshold, until the channel occupancy ratio of the terminal device becomes smaller than or equal to the sixth threshold.

The sixth threshold may be specified in a specification, or may be configured by the network device. This embodiment is not limited to any of these examples.

In at least one embodiment, in a possible implementation of this embodiment, the transmitting unit 410 may be further configured to transmit a channel busy ratio measured by the terminal device to the network device.

In this embodiment, the terminal device can transmit the channel occupancy ratio of the terminal device to the network device, such that the network device can clearly know the channel usage of the terminal device, and then allocate appropriate transmission resources to the terminal device, thereby avoiding congestion of sidelink data transmitted by the terminal device. In this way, the reliability of the sidelink data transmission in the V2X system can be improved.

Figure 5:
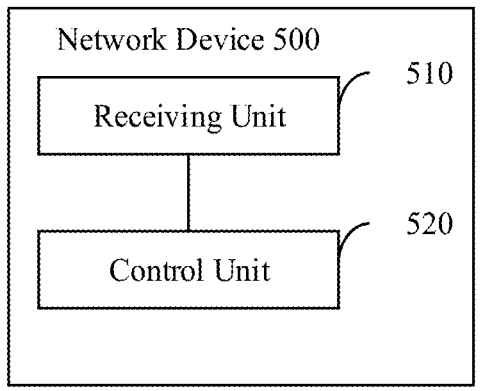
FIG. 5 is a schematic block diagram of a network device according to an embodiment of the present disclosure.

FIG. 5A is a schematic block diagram of a network device 500 according to an embodiment of the present disclosure, as shown in FIG. 5A. This embodiment provides a network device for performing the method in the embodiment corresponding to FIG. 3.

Specifically, the network device 500 includes functional modules for performing the method in the embodiment corresponding to FIG. 3. The network device 500 may include a receiving unit 510 and a control unit 520. The receiving unit 510 may be configured to receive a channel occupancy ratio of a terminal device as transmitted by the terminal device. The control unit 520 may be configured to perform a transmission resource allocation control process for the terminal device based on the channel occupancy ratio of the terminal device.

The network device in the present disclosure may be a mobility management device, e.g., an Access and Mobility Management Function (AMF) in a 5G core network (i.e., Next Generation Core Network, or NGCN) or a Mobility Management Entity (MME) in a 4G core network (i.e., Evolved Packet Core Network, or EPC), or a policy control device, e.g., a Vehicle to Everything Control Function (V2X CF) or a Policy Control Function (PCF), etc. This embodiment is not limited to any of these specific examples.

Here, the network structure not only supports the V2X CF as a standalone network element, but also supports the function of the V2X CF to be incorporated in the PCF. This embodiment is not limited to any of these specific examples.

In at least one embodiment, in a possible implementation of this embodiment, the channel occupancy ratio of the terminal device may be a channel occupancy ratio of the terminal device operating in a first transmission mode, or a channel occupancy ratio of the terminal device operating in a second transmission mode, or a channel occupancy ratio of the terminal device operating in the first transmission mode and the second transmission mode. This embodiment is not limited to any of these examples. Here, the first transmission mode, i.e., Transmission Mode A, refers to the transmission mode in which the network device allocates transmission resources to the terminal device, and the second transmission mode, i.e., Transmission Mode B, refers to a transmission mode in which the terminal device selects transmission resources autonomously.

In at least one embodiment, the second transmission mode may refer to a transmission mode in which another terminal device (e.g., a group head terminal) allocates transmission resources to the terminal device.

In at least one embodiment, in a possible implementation of this embodiment, the channel occupancy ratio of the terminal device may include a channel occupancy ratio of the terminal device within a time period of [n−p, n+q] time units. The terminal device can calculate the channel occupancy ratio of the terminal device within the time period of [n−p, n+q] time units. Here, the parameter p can be 0 or a positive integer, the parameter q can be −1, 0 or a positive integer, and the parameter n can be the time at which the terminal device measures the CR, or the time at which the terminal device transmits the CR to the network device. Here, the time unit may be a time slot, a subframe, etc.

The parameter p may be specified in a specification, configured by the network device, or selected by the terminal device autonomously. This embodiment is not limited to any of these examples.

For example, after the terminal device autonomously selects the parameter p, the receiving unit 510 may be further configured to receive the parameter p transmitted by the terminal device. In this way, the network device can learn the start time of the calculation time period corresponding to the received channel occupancy ratio of the terminal device.

Similarly, the parameter q may be specified in a specification, configured by the network device, or selected by the terminal device autonomously. This embodiment is not limited to any of these examples.

For example, after the terminal device autonomously selects the parameter q, the receiving unit 510 may be further configured to receive the parameter q transmitted by the terminal device. In this way, the network device can learn the end time of the calculation time period corresponding to the received channel occupancy ratio of the terminal device.

It can be appreciated that if the terminal selects the parameter p and the parameter q autonomously, the receiving unit 510 may be further configured to receive both the parameter p and the parameter q transmitted by the terminal device. In this way, the network device can learn the start time and the end time of the calculation time period corresponding to the received channel occupancy ratio of the terminal device.

In at least one embodiment, in a possible implementation of this embodiment, the channel occupancy ratio of the terminal device may be a channel occupancy ratio of the terminal device operating in the first transmission mode within the time period of [n−p, n+q] time units, a channel occupancy ratio of the terminal device operating in the second transmission mode within the time period of [n−p, n+q] time units, or a channel occupancy ratio of the terminal device operating in the first transmission mode and the second transmission mode within the time period of [n−p, n+q] time units. This embodiment is not limited to any of these examples. Here, the time unit may be a time slot, a subframe, etc. Here, the first transmission mode, i.e., Transmission Mode A, refers to the transmission mode in which the network device allocates transmission resources to the terminal device, and the second transmission mode, i.e., Transmission Mode B, refers to a transmission mode in which the terminal device selects transmission resources autonomously.

In at least one embodiment, the second transmission mode may refer to a transmission mode in which another terminal device (e.g., a group head terminal) allocates transmission resources to the terminal device.

In at least one embodiment, in a possible implementation of this embodiment, the receiving unit 510 may be configured to: receive channel occupancy ratios for all levels of a first parameter of sidelink data as transmitted by the terminal device; receive channel occupancy ratios for a part of the levels of the first parameter of sidelink data as transmitted by the terminal device; or receive channel occupancy ratios for one or more levels of the first parameter indicated in configuration information as transmitted by the terminal device based on the configuration information, which is transmitted by the network device.

Here, the first parameter may include, but not limited to, at least one of: priority, reliability, delay, data rate, communication range, Quality of Service (QoS) Class Identifier (QCI), QoS Flow Identifier (QFI), and PC5 QoS Index (PQI).

In at least one embodiment, in a possible implementation of this embodiment, the receiving unit 510 may be configured to receive the channel occupancy ratio of the terminal device as transmitted by the terminal device when a first triggering condition is met.

Here, the first triggering condition may include, but not limited to, at least one of:
whether the terminal device receives first indication information transmitted by the network device,
whether the channel occupancy ratio of the terminal device is greater than a first threshold,
whether a channel busy ratio measured by the terminal device is greater than a second threshold,
a reporting period,
expiry of a timer, and
whether a counter reaches a third threshold.

In an implementation, the first indication information may further contain at least one of a parameter p and a parameter q, for indicating a time period of [n−p, n+q] time units corresponding to the channel occupancy ratio of the terminal device as transmitted by the terminal device. Here, the time unit may be a time slot, subframe, etc.

In an implementation, the first indication information may further indicate at least one of:
the terminal device to transmit a channel occupancy ratio of the terminal device operating in a first transmission mode to the network device;
the terminal device to transmit a channel occupancy ratio of the terminal device operating in a second transmission mode to the network device; and
the terminal device to transmit a channel occupancy ratio for at least one level of a first parameter of sidelink data to the network device.

Here, the first parameter may include, but not limited to, at least one of: priority, reliability, delay, data rate, communication range, QCI, QFI, and PQI.

The first threshold, the second threshold, and the third threshold may be specified in a specification or configured by the network device. This embodiment is not limited to any of these examples.

In an implementation, the receiving unit 510 may be further configured to receive second indication information transmitted by the terminal device. The second indication information indicates that the channel occupancy ratio of the terminal device is greater than the first threshold or the channel busy ratio measured by the terminal device is greater than the second threshold.

In at least one embodiment, in a possible implementation of this embodiment, the control unit 520 may be further configured to configure a fourth threshold for the terminal device to perform congestion control when the channel occupancy ratio of the terminal device is greater than the fourth threshold; or transmit a third parameter and a fourth parameter to the terminal device, for the terminal device to determine the fourth threshold based on the third parameter and the fourth parameter and to perform congestion control when the channel occupancy ratio of the terminal device is greater than the fourth threshold.

In a specific implementation, the control unit 520 may be further configured to transmit third indication information to the terminal device, for the terminal device to perform congestion control in accordance with the third indication information.

For example, the third indication information may indicate:
the terminal device to prioritize transmission of sidelink data that is based on a first transmission mode, and discard sidelink data that is based on a second transmission mode, or
a fifth threshold for the terminal device to perform congestion control in accordance with a fifth parameter of sidelink data and the fifth threshold.

Here, the first transmission mode, i.e., Transmission Mode A, refers to the transmission mode in which the network device allocates transmission resources to the terminal device, and the second transmission mode, i.e., Transmission Mode B, refers to a transmission mode in which the terminal device selects transmission resources autonomously.

In at least one embodiment, the second transmission mode may refer to a transmission mode in which another terminal device (e.g., a group head terminal) allocates transmission resources to the terminal device.

In an implementation, the receiving unit 510 may be further configured to receive fourth indication information transmitted by the terminal device. The fourth indication information indicates that the channel occupancy ratio of the terminal device is greater than the fourth threshold.

In an implementation, when the channel occupancy ratio of the terminal device is greater than the fourth threshold, the terminal device may perform congestion control using one or more transmission parameters for congestion control.

The one or more transmission parameters for congestion control may include, but not limited to, at least one of: Modulation and Coding Scheme (MCS), number of PRBs, number of subbands, number of retransmissions, and maximum channel occupancy ratio.

Here, each transmission parameter may be a parameter range, and the terminal device may select corresponding transmission parameter(s) within the parameter range for transmitting sidelink data, so as to perform congestion control.

Here, the one or more transmission parameters for congestion control may be specified in a specification or configured by the network device. This embodiment is not limited to any of these examples.

For example, the one or more transmission parameters for congestion control may be configured by the network device according to at least one of a channel busy ratio and a fifth parameter. This embodiment is not limited to any of these examples.

The fifth parameter may include, but not limited to, at least one of: priority, PQI, QCI, QFI, bearer, logical channel, communication range, data rate, and reliability.

In at least one embodiment, in a possible implementation of this embodiment, the control unit 520 may be further configured to configure a sixth threshold for the terminal device to discard sidelink data to be transmitted when the channel occupancy ratio of the terminal device is greater than the sixth threshold, until the channel occupancy ratio of the terminal device becomes smaller than or equal to the sixth threshold.

In at least one embodiment, in a possible implementation of this embodiment, the receiving unit 510 may be further configured to receive a channel busy ratio measured by the terminal device as transmitted by the terminal device.

In this embodiment, the network device receives the channel occupancy ratio of the terminal device transmitted by the terminal device via the receiving unit, such that the network device can clearly know the channel usage of the terminal device. Then, the control unit allocates appropriate transmission resources to the terminal device, thereby avoiding congestion of sidelink data transmitted by the terminal device. In this way, the reliability of the sidelink data transmission in the V2X system can be improved.

Figure 6:
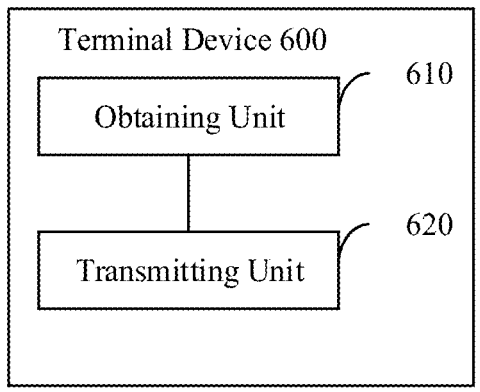
FIG. 6 is a schematic block diagram of another terminal device according to an embodiment of the present disclosure.

FIG. 6 is a schematic block diagram of another terminal device 600 according to an embodiment of the present disclosure, as shown in FIG. 6. This embodiment provides a terminal device 600 for performing the method performed by the terminal device in the embodiment corresponding to FIG. 3.

Specifically, the terminal device 600 includes functional modules for performing the method performed by the terminal device in the embodiment corresponding to FIG. 3. The terminal device 600 may include an obtaining unit 610 and a transmitting unit 620. Here, the obtaining unit 610 is configured to obtain a transmission parameter range configured by a network device based on at least one of a channel busy ratio and a fifth parameter of sidelink data. The transmitting unit 620 is configured to select one or more transmission parameters from the transmission parameter range for transmitting the sidelink data.

The fifth parameter may include, but not limited to, at least one of: priority, reliability, delay, data rate, communication range, QCI, QFI, and PQI.

The network device in the present disclosure may be a mobility management device, e.g., an Access and Mobility Management Function (AMF) in a 5G core network (i.e., Next Generation Core Network, or NGCN) or a Mobility Management Entity (MME) in a 4G core network (i.e., Evolved Packet Core Network, or EPC), or a policy control device, e.g., a Vehicle to Everything Control Function (V2X CF) or a Policy Control Function (PCF), etc. This embodiment is not limited to any of these specific examples.

In this embodiment, the obtaining unit obtains the transmission parameter range configured by the network device for the terminal device based on at least one of the channel busy ratio and the fifth parameter of sidelink data, such that the transmitting unit can obtain one or more transmission parameters based on the transmission parameter range for transmitting the sidelink data, thereby achieving congestion control of the terminal device.

Figure 7:
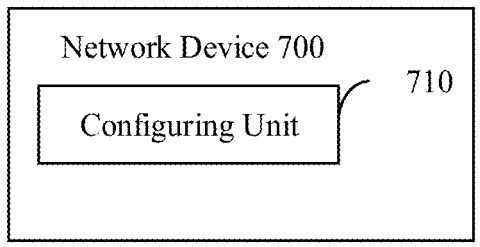
FIG. 7 is a schematic block diagram of another network device according to an embodiment of the present disclosure.

FIG. 7 is a schematic block diagram of another network device 700 according to an embodiment of the present disclosure, as shown in FIG. 7. This embodiment provides a network device for performing the method performed by the network device in the embodiment corresponding to FIG. 3.

Specifically, the network device 700 includes functional modules for performing the method performed by the network device in the embodiment corresponding to FIG. 3. The network device 700 may include a configuring unit 710 configured to configure a transmission parameter range for a terminal device based on at least one of a channel busy ratio and a fifth parameter of sidelink data, for the terminal device to select one or more transmission parameters from the transmission parameter range for transmitting the sidelink data.

The fifth parameter may include, but not limited to, at least one of: priority, reliability, delay, data rate, communication range, QCI, QFI, and PQI.

The network device in the present disclosure may be a mobility management device, e.g., an Access and Mobility Management Function (AMF) in a 5G core network (i.e., Next Generation Core Network, or NGCN) or a Mobility Management Entity (MME) in a 4G core network (i.e., Evolved Packet Core Network, or EPC), or a policy control device, e.g., a Vehicle to Everything Control Function (V2X CF) or a Policy Control Function (PCF), etc. This embodiment is not limited to any of these specific examples.

In this embodiment, the network device can configure the transmission parameter range for the terminal device based on at least one of the channel busy ratio and the fifth parameter of sidelink data via the configuring unit, such that the terminal device can obtain one or more transmission parameters based on the transmission parameter range for transmitting the sidelink data, thereby achieving congestion control of the terminal device.

Figure 8:
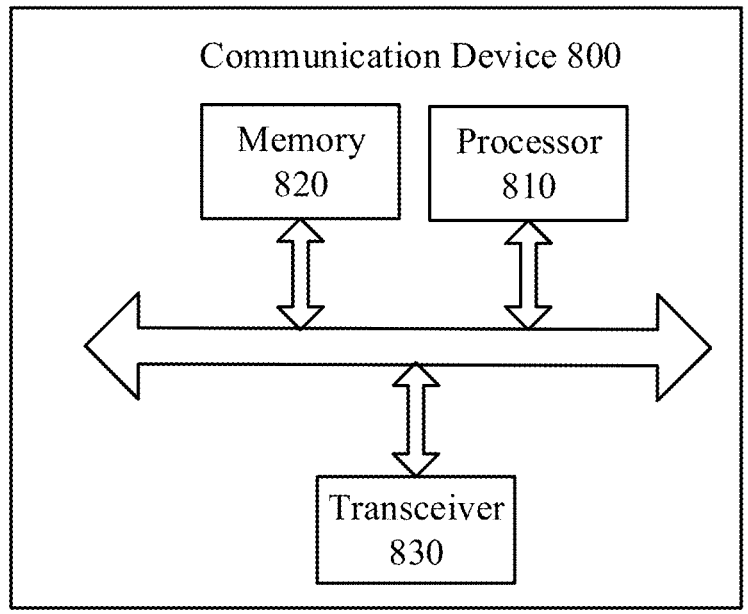
FIG. 8 is a schematic block diagram of a communication device according to an embodiment of the present disclosure.

FIG. 8 is a schematic diagram showing a structure of a communication device 800 according to an embodiment of the present disclosure. The communication device 800 shown in FIG. 8 includes a processor 810, and the processor 810 can invoke and execute a computer program from a memory to perform the method according to any of the embodiments of the present disclosure.

In at least one embodiment, as shown in FIG. 8, the communication device 800 may further include a memory 820. The processor 810 can invoke and execute a computer program from the memory 820 to perform the method according to any of the embodiments of the present disclosure.

The memory 820 may be a separate device independent of the processor 810, or may be integrated in the processor 810.

In at least one embodiment, as shown in FIG. 8, the communication device 800 may further include a transceiver 830. The processor 810 can control the transceiver 830 to communicate with other devices, and in particular to transmit information or data to other devices or receive information or data transmitted by other devices.

Here, the transceiver 830 may include a transmitter and a receiver. The transceiver 830 may further include one or more antennas.

In at least one embodiment, the communication device 800 may be the network device in the embodiment of the present disclosure, and the communication device 800 can perform corresponding procedures implemented by the network device in the method according to any of the embodiments of the present disclosure. Details thereof will be omitted here for simplicity.

In at least one embodiment, the communication device 800 may be the terminal device in the embodiment of the present disclosure, and the communication device 800 can perform corresponding procedures implemented by the terminal device in the method according to any of the embodiments of the present disclosure. Details thereof will be omitted here for simplicity.

Figure 9:
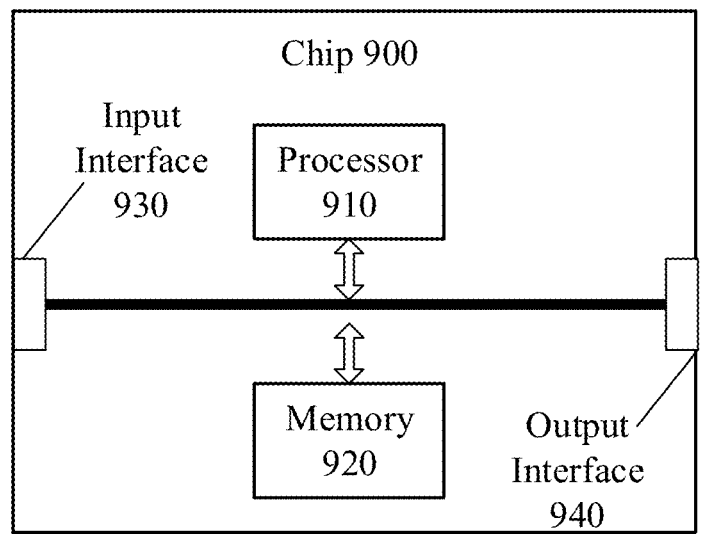
FIG. 9 is a schematic block diagram of a chip according to an embodiment of the present disclosure.

FIG. 9 is a schematic diagram showing a structure of a chip 900 according to an embodiment of the present disclosure. The chip 900 shown in FIG. 9 includes a processor 910, and the processor 910 can invoke and run a computer program from a memory to implement the method in the embodiment of the present disclosure.

In at least one embodiment, as shown in FIG. 9, the chip 900 may further include a memory 920. The processor 910 can invoke and run a computer program from the memory 920 to implement the method in the embodiment of the present disclosure.

The memory 920 may be a separate device independent from the processor 910, or may be integrated in the processor 910.

In at least one embodiment, the chip 900 may further include an input interface 930. The processor 910 can control the input interface 930 to communicate with other devices or chips, and in particular, obtain information or data transmitted by other devices or chips.

In at least one embodiment, the chip 900 may further include an output interface 940. The processor 910 can control the output interface 940 to communicate with other devices or chips, and in particular, output information or data to other devices or chips.

In at least one embodiment, the chip can be applied to the network device in the embodiment of the present disclosure, and the chip can implement the corresponding processes implemented by the network device in the various methods of the embodiments of the present disclosure. For the sake of brevity, details thereof will be omitted here.

In at least one embodiment, the chip can be applied to the terminal device in the embodiment of the present disclosure, and the chip can implement the corresponding process implemented by the terminal device in each method of the embodiment of the present disclosure. For the sake of brevity, details thereof will be omitted here.

It can be appreciated that the chip in the embodiment of the present disclosure may also be referred to as a system-level chip, a system-chip, a chip system, or a system-on-chip.

Figure 10:
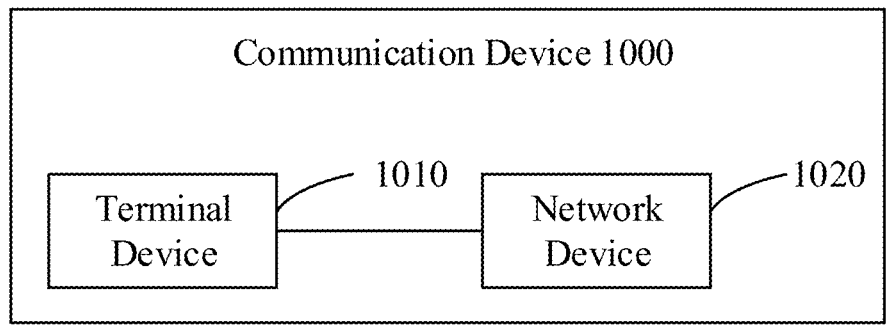
FIG. 10 is a schematic block diagram of a communication system according to an embodiment of the present disclosure.

FIG. 10 is a schematic block diagram of a communication system 1000 according to an embodiment of the present disclosure. As shown in FIG. 10, the communication system 1000 includes a terminal device 1010 and a network device 1020.

Here, the terminal device 1010 can be configured to implement the corresponding functions implemented by the terminal device in the above method, and the network device 1020 can be configured to implement the corresponding functions implemented by the network device in the above method. For the sake of brevity, details thereof will be omitted here.

It is to be noted that the processor in the embodiment of the present disclosure may be an integrated circuit chip with signal processing capability. In an implementation, the steps of the above method embodiments can be implemented by hardware integrated logic circuits in a processor or instructions in the form of software. The processor can be a general purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component. The methods, steps, and logical block diagrams disclosed in the embodiments of the present disclosure can be implemented or performed. The general purpose processor may be a microprocessor or any conventional processor. The steps of the methods disclosed in the embodiments of the present disclosure may be directly embodied as being performed and completed by a hardware decoding processor, or by a combination of hardware and software modules in the decoding processor. The software modules can be located in a known storage medium in the related art, such as random access memory, flash memory, read-only memory, programmable read-only memory, electrically erasable programmable memory, or register. The storage medium can be located in the memory, and the processor can read information from the memory and perform the steps of the above methods in combination with its hardware.

It can be appreciated that the memory in the embodiments of the present disclosure may be a volatile memory or a non-volatile memory, or may include both volatile and non-volatile memories. Here, the non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which is used as an external cache. As illustrative, rather than limiting, many forms of RAMs are available, including Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)), and Direct Rambus RAM (DR RAM). It is to be noted that the memory used for the system and method described in the present disclosure is intended to include, but not limited to, these and any other suitable types of memories.

It can be appreciated that the above memories are exemplary only, rather than limiting the present disclosure. For example, the memory in the embodiment of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), or a Direct Rambus RAM (DR RAM). That is, the memory in the embodiments of the present disclosure is intended to include, but not limited to, these and any other suitable types of memories.

An embodiment of the present disclosure also provides a computer readable storage medium for storing a computer program.

In at least one embodiment, the computer readable storage medium can be applied to the network device in the embodiment of the present disclosure, and the computer program can cause a computer to perform corresponding procedures implemented by the network device in the method according to any of the embodiments of the present disclosure. Details thereof will be omitted here for simplicity.

In at least one embodiment, the computer readable storage medium can be applied to the terminal device in the embodiment of the present disclosure, and the computer program can cause a computer to perform corresponding procedures implemented by the terminal device in the method according to any of the embodiments of the present disclosure. Details thereof will be omitted here for simplicity.

An embodiment of the present disclosure also provides a computer program product including computer program instructions.

In at least one embodiment, the computer program product can be applied to the network device in the embodiment of the present disclosure, and the computer program instructions can cause a computer to perform corresponding procedures implemented by the network device in the method according to any of the embodiments of the present disclosure. Details thereof will be omitted here for simplicity.

In at least one embodiment, the computer program product can be applied to the terminal device in the embodiment of the present disclosure, and the computer program instructions can cause a computer to perform corresponding procedures implemented by the terminal device in the method according to any of the embodiments of the present disclosure. Details thereof will be omitted here for simplicity.

An embodiment of the present disclosure also provides a computer program.

In at least one embodiment, the computer program can be applied to the network device in the embodiment of the present disclosure. The computer program, when executed on a computer, can cause the computer to perform corresponding procedures implemented by the network device in the method according to any of the embodiments of the present disclosure. Details thereof will be omitted here for simplicity.

In at least one embodiment, the computer program can be applied to the terminal device in the embodiment of the present disclosure. The computer program, when executed on a computer, can cause the computer to perform corresponding procedures implemented by the terminal device in the method according to any of the embodiments of the present disclosure. Details thereof will be omitted here for simplicity.

It can be appreciated by those skilled in the art that units and algorithm steps in the examples described in connection with the embodiments disclosed herein can be implemented in electronic hardware or any combination of computer software and electronic hardware. Whether these functions are executed by hardware or software depends on specific applications and design constraint conditions of the technical solutions. Those skilled in the art may use different methods for each specific application to implement the described functions, and such implementation is to be encompassed by the scope of this disclosure.

Those skilled in the art can clearly understand that, for the convenience and conciseness of the description, for the specific operation processes of the systems, devices, and units described above, reference can be made to the corresponding processes in the foregoing method embodiments, and details thereof will be omitted here.

In the embodiments of the present disclosure, it can be appreciated that the disclosed systems, devices, and methods may be implemented in other ways. For example, the device embodiments described above are illustrative only. For example, the divisions of the units are only divisions based on logical functions, and there may be other divisions in actual implementations. For example, more than one unit or component may be combined or integrated into another system, or some features can be ignored or omitted. In addition, the mutual coupling or direct coupling or communicative connection as shown or discussed may be indirect coupling or communicative connection between devices or units via some interfaces which may be electrical, mechanical, or in any other forms.

The units described as separate components may or may not be physically separated, and the components shown as units may or may not be physical units, that is, they may be co-located or distributed across a number of network elements. Some or all of the units may be selected according to actual needs to achieve the objects of the solutions of the embodiments.

In addition, the functional units in the embodiments of the present disclosure may be integrated into one processing unit, or alternatively be separate physical modules, or two or more units may be integrated into one unit.

When the function is implemented in the form of a software functional unit and sold or used as a standalone product, it can be stored in a computer readable storage medium. Based on this understanding, all or part of the technical solutions according to the embodiments of the present disclosure, or the part thereof that contributes to the related art, can be embodied in the form of a software product. The computer software product may be stored in a storage medium and contain instructions to enable a computer device, such as a personal computer, a server, or a network device, etc., to perform all or part of the steps of the method described in each of the embodiments of the present disclosure. The storage medium may include a Universal Serial Bus flash drive, a mobile hard disk, a Read-Only Memory (ROM), a Random Access Memory (RAM), a magnetic disk, an optical disc, or any other medium capable of storing program codes.

While the specific embodiments of the present disclosure have been described above, the scope of the present disclosure is not limited to these embodiments. Various variants and alternatives can be made by those skilled in the art without departing from the scope of the present disclosure. These variants and alternatives are to be encompassed by the scope of present disclosure as defined by the claims as attached.

What is claimed is:

1. A communication method, comprising:
   transmitting, by a terminal device, a channel occupancy ratio of the terminal device to a network device,
   wherein the channel occupancy ratio of the terminal device comprises at least one of:
   a channel occupancy ratio of the terminal device operating in a first transmission mode within the time period of [n−p, n+q] time units, wherein the first transmission mode refers to a transmission mode in which the network device allocates transmission resources to the terminal device, where n indicates a time of measuring the channel occupancy ratio or a time of transmitting the channel occupancy ratio, p is 0 or a positive integer, and q is −1, 0, or a positive integer, and
   a channel occupancy ratio of the terminal device operating in a second transmission mode within the time period of [n−p, n+q] time units, wherein the second transmission mode refers to a transmission mode in which the terminal device selects transmission resources autonomously.

2. The method according to claim 1, wherein said transmitting, by the terminal device, the channel occupancy ratio of the terminal device to the network device comprises:
   transmitting, by the terminal device, the channel occupancy ratio of the terminal device to the network device when a first triggering condition is met.

3. The method according to claim 2, wherein the first triggering condition comprises at least one of:
   whether the terminal device receives first indication information transmitted by the network device,
   whether the channel occupancy ratio of the terminal device is greater than a first threshold,
   whether a channel busy ratio measured by the terminal device is greater than a second threshold,
   a reporting period,
   expiry of a timer, and
   whether a counter reaches a third threshold.

4. The method according to claim 3, wherein the first indication information further indicates at least one of:
   the terminal device to transmit a channel occupancy ratio of the terminal device operating in a first transmission mode to the network device;
   the terminal device to transmit a channel occupancy ratio of the terminal device operating in a second transmission mode to the network device; and
   the terminal device to transmit a channel occupancy ratio for at least one level of a first parameter of sidelink data to the network device.

5. The method according to claim 1, further comprising:
   performing, by the terminal device, congestion control when the channel occupancy ratio of the terminal device is greater than a fourth threshold.

6. The method according to claim 5, wherein said performing, by the terminal device, congestion control comprises:
   performing, by the terminal device, congestion control in accordance with a first criterion, and
   wherein the first criterion comprises at least one of:
   the terminal device performing congestion control in accordance with third indication information transmitted by the network device,
   the terminal device prioritizing transmission of sidelink data that is based on a first transmission mode, and discarding sidelink data that is based on a second transmission mode,
   the terminal device performing congestion control in accordance with a second parameter of sidelink data to be transmitted, or
   the terminal device discarding sidelink data to be transmitted until the channel occupancy ratio of the terminal device becomes smaller than or equal to the fourth threshold.

7. The method according to claim 6, wherein
   the first transmission mode refers to a transmission mode in which the network device allocates transmission resources to the terminal device, and
   the second transmission mode refers to a transmission mode in which the terminal device selects transmission resources autonomously.

8. The method according to claim 6, wherein the second parameter comprises at least one of: priority, reliability, delay, data rate, communication range, QCI, QFI, and PQI.

9. A terminal device, comprising: a processor and a memory, wherein the processor invokes and executes a computer program from the memory to perform operations comprising:
   transmitting a channel occupancy ratio of the terminal device to a network device,
   wherein the channel occupancy ratio of the terminal device comprises at least one of:
   a channel occupancy ratio of the terminal device operating in a first transmission mode within the time period of [n−p, n+q] time units, wherein the first transmission mode refers to a transmission mode in which the network device allocates transmission resources to the terminal device, where n indicates a time of measuring the channel occupancy ratio or a time of transmitting the channel occupancy ratio, p is 0 or a positive integer, and q is −1, 0, or a positive integer, and
   a channel occupancy ratio of the terminal device operating in a second transmission mode within the time period of [n−p, n+q] time units, wherein the second transmission mode refers to a transmission mode in which the terminal device selects transmission resources autonomously.

10. The terminal device according to claim 9, wherein said transmitting the channel occupancy ratio of the terminal device to the network device comprises:
    transmitting, by the terminal device, the channel occupancy ratio of the terminal device to the network device when a first triggering condition is met.

11. The terminal device according to claim 10, wherein the first triggering condition comprises at least one of:
    whether the terminal device receives first indication information transmitted by the network device,
    whether the channel occupancy ratio of the terminal device is greater than a first threshold,
    whether a channel busy ratio measured by the terminal device is greater than a second threshold, a reporting period,
expiry of a timer, and
whether a counter reaches a third threshold.

12. The terminal device according to claim 11, wherein the first indication information further indicates at least one of:
the terminal device to transmit a channel occupancy ratio of the terminal device operating in a first transmission mode to the network device;
the terminal device to transmit a channel occupancy ratio of the terminal device operating in a second transmission mode to the network device; and
the terminal device to transmit a channel occupancy ratio for at least one level of a first parameter of sidelink data to the network device.

13. The terminal device according to claim 9, wherein the operations further comprise:
performing, by the terminal device, congestion control when the channel occupancy ratio of the terminal device is greater than a fourth threshold.

14. The terminal device according to claim 13, wherein said performing, by the terminal device, congestion control comprises:
performing, by the terminal device, congestion control in accordance with a first criterion, and
wherein the first criterion comprises at least one of:
the terminal device performing congestion control in accordance with third indication information transmitted by the network device,
the terminal device prioritizing transmission of sidelink data that is based on a first transmission mode, and discarding sidelink data that is based on a second transmission mode,
the terminal device performing congestion control in accordance with a second parameter of sidelink data to be transmitted, or
the terminal device discarding sidelink data to be transmitted until the channel occupancy ratio of the terminal device becomes smaller than or equal to the fourth threshold.

15. A network device, comprising: a processor and a memory, wherein the processor invokes and executes a computer program from the memory to perform operations comprising:
receiving a channel occupancy ratio of a terminal device as transmitted by the terminal device; and
performing a transmission resource allocation control process for the terminal device based on the channel occupancy ratio of the terminal device,
wherein the channel occupancy ratio of the terminal device comprises at least one of:
a channel occupancy ratio of the terminal device operating in a first transmission mode within the time period of [n−p, n+q] time units, wherein the first transmission mode refers to a transmission mode in which the network device allocates transmission resources to the terminal device, where n indicates a time of measuring the channel occupancy ratio or a time of transmitting the channel occupancy ratio, p is 0 or a positive integer, and q is −1, 0, or a positive integer, and
a channel occupancy ratio of the terminal device operating in a second transmission mode within the time period of [n−p, n+q] time units, wherein the second transmission mode refers to a transmission mode in which the terminal device selects transmission resources autonomously.

16. The network device according to claim 15, wherein said receiving the channel occupancy ratio of the terminal device as transmitted by the terminal device comprises:
receiving the channel occupancy ratio of the terminal device as transmitted by the terminal device when a first triggering condition is met.

17. The network device according to claim 16, wherein the first triggering condition comprises at least one of:
whether the terminal device receives first indication information transmitted by the network device,
whether the channel occupancy ratio of the terminal device is greater than a first threshold,
whether a channel busy ratio measured by the terminal device is greater than a second threshold,
a reporting period,
expiry of a timer, and
whether a counter reaches a third threshold.

18. The network device according to claim 17, wherein the first indication information further indicates at least one of:
the terminal device to transmit a channel occupancy ratio of the terminal device operating in the first transmission mode to the network device;
the terminal device to transmit a channel occupancy ratio of the terminal device operating in the second transmission mode to the network device; and
the terminal device to transmit a channel occupancy ratio for at least one level of a first parameter of sidelink data to the network device.

19. The network device according to claim 15, wherein the operations further comprise:
transmitting third indication information to the terminal device, for the terminal device to perform congestion control in accordance with the third indication information.

20. The network device according to claim 19, wherein the third indication information indicates:
the terminal device to prioritize transmission of sidelink data that is based on a first transmission mode, and discard sidelink data that is based on a second transmission mode, or
a fifth threshold for the terminal device to perform congestion control in accordance with a fifth parameter of sidelink data and the fifth threshold.

* * * * *